United States Patent [19]

Prichard et al.

[11] 4,069,320

[45] Jan. 17, 1978

[54] SUBSTITUTED DIPHENYL-3-FORMAZANCARBONITRILE INSECTICIDES

[75] Inventors: William W. Prichard, Hockessin; Francis Wilfred Stacey, Wilmington, both of Del.

[73] Assignee: E. I. Du Pont de Nemours and Company, Wilmington, Del.

[21] Appl. No.: 651,954

[22] Filed: Jan. 23, 1976

Related U.S. Application Data

[63] Continuation-in-part of Ser. No. 510,546, Sept. 30, 1974, abandoned, which is a continuation-in-part of Ser. No. 487,027, July 10, 1974, abandoned, which is a continuation-in-part of Ser. No. 429,029, Dec. 19, 1973, abandoned.

[51] Int. Cl.$^2$ ...................... A01N 9/20; C07C 107/00
[52] U.S. Cl. ..................................... 424/226; 260/192
[58] Field of Search ........................ 424/226; 260/192

[56] References Cited

U.S. PATENT DOCUMENTS

| | | | |
|---|---|---|---|
| 3,541,107 | 11/1970 | Henderson | 260/192 X |
| 3,717,625 | 2/1970 | Peters et al. | 260/162 |
| 3,755,598 | 8/1973 | Howe et al. | 424/226 X |
| 3,786,131 | 1/1974 | Buchel et al. | 424/226 |

OTHER PUBLICATIONS

Dubenko et al., "Investigation in the Arylhydrazone Series Derivatives of Glyoxylic Acid," J. Org. Chem. of USSR 2(4), (1966), pp. 710–712.

*Primary Examiner*—Albert T. Meyers
*Assistant Examiner*—D. W. Robinson

[57] ABSTRACT

Substituted 1,5-diphenyl-3-formazancarbonitriles, certain of which are novel, are useful in controlling insects. A preferred compound is 1,5-bis(4-trifluoromethylphenyl)-3-formazancarbonitrile.

124 Claims, No Drawings

SUBSTITUTED DIPHENYL-3-FORMAZANCARBONITRILE INSECTICIDES

CROSS-REFERENCE TO RELATED APPLICATION

This application is a continuation-in-part of copending application Ser. No. 510,546, filed Sept. 30, 1974, now abandoned, which is a continuation-in-part of application Ser. No. 487,027, filed July 10, 1974, now abandoned, which, in turn, is a continuation-in-part of application Ser. No. 429,029, filed Dec. 19, 1973, likewise now abandoned.

BACKGROUND OF THE INVENTION

This invention relates to substituted 1,5-diphenyl-3-formazancabonitriles, certain of which are novel and their use in controlling insects.

Certain 1,5-diaryl-3-formazancarbonitriles and their preparation have been generally disclosed by Nasileva and Eromakova, Zh. Analit. Khim., 19, 1305 (1964), Nineham, Chem. Reviews, 55, 355–483 (1955), Shawali and El-Galil, Tetrahedron, 27, 4305–4316 (1971), Zh. Organ. Khim., 2, 708–10 (1966), C.A. 65, 8800 (1966); Zh. Org. Khim. 7, 1932–7 (1971), C.A. Jan.-June 1972 - Chemical Substance Index, and Henderson in U.S. Pat. No. 3,541,107. However, the insect-control properties demonstrated by the compounds of this invention are not disclosed in the prior art.

Insect control is an important factor in maintaining adequate and healthy crop growth, since insect infestation can totally destroy or severely diminish food supplies of both man and animal; additionally, maintenance of general public health is dependent in part on adequate insect control. Thus, there is a continuing need for new products having high activity or better selectivity in controlling insect populations since existing products have not been able to completely control the insect populations.

SUMMARY OF THE INVENTION

This invention provides compounds useful in controlling insects. These compounds are represented by the following general Formula I:

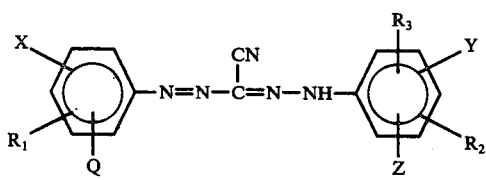

(I)

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl or 1–4 carbon atoms;
$R_1$ is hydrogen, chlorine, bromine, fluorine, or trifluoromethyl;
$R_2$ is hydrogen, chlorine, bromine, fluorine or trifluoromethyl;
$R_3$ is hydrogen, chlorine, bromine, fluorine, trifluoromethyl or nitro;
Z is hydrogen, chlorine, bromine, or fluorine, and
Q is hydrogen, chlorine, bromine, or fluorine, provided
1. when Y is alkyl of 1–4 carbon atoms, X is trifluoromethyl;
2. when X is 4-chloro, 4-bromo, or 4-fluoro, and $R_1$, Q and three of $R_2$, Z, Y, and $R_3$ are hydrogen, then the remainder of $R_2$, Z, Y, and $R_3$ must be other than 4-chloro, 4-bromo, or 4-fluoro;
3. when X is nitro, $R_3$ is other than hydrogen; and
4. when X is halogen, at least one of $R_1$, $R_2$, $R_3$, Q, Y and Z must be other than hydrogen and the agriculturally suitable salts thereof, preferably the lithium, potassium, and sodium salts.

Certain of the compounds of Formula I are novel. These compounds are represented by Formula II:

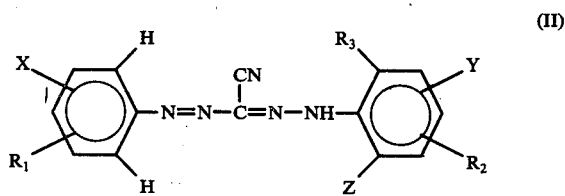

(II)

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;
$R_1$ is hydrogen, chlorine, bromine, fluorine or trifluoromethyl;
$R_2$ is hydrogen, chlorine, bromine, fluorine or trifluoromethyl;
$R_3$ is hydrogen, chlorine, bromine, fluorine, trifluoromethyl, or nitro;
Z is hydrogen, chlorine, bromine, or fluorine, provided
1. when X is nitro at least one of Y or $R_3$ must be trifluoromethyl;
2. when Y is alkyl of 1–4 carbon atoms, X is trifluoromethyl;
3. when $R_3$ is nitro, X is trifluoromethyl; and
4. when X is halogen, no more than three of $R_1$, $R_2$, $R_3$, Z and Y can be hydrogen, and the agriculturally suitable salts thereof, preferably the lithium, potassium, and sodium salts.

The following novel compounds of Formula II are individually the most preferred for their high insecticidal activity.
1,5-bis(4-trifluoromethylphenyl)-3-formazancarbonitrile;
1,5-bis(3,4-dichlorophenyl)-3-formazancarbonitrile;
1-(4-trifluoromethylphenyl)-5-phenyl-3-formazancarbonitrile;
1-(4-trifluoromethylphenyl)-5-(4-chlorophenyl)-3-formazancarbonitrile;

1-(3-trifluoromethylphenyl)-5-(4-chlorophenyl)-3-formazancarbonitrile;
1-(3-trifluoromethylphenyl)-5-(3,5-dichlorophenyl)-3-formazancarbonitrile;
1-(4-trifluoromethylphenyl)-5-(3,4-dichlorophenyl)-3-formazancarbonitrile;
1,5-bis(3,5-dichlorophenyl)-3-formazancarbonitrile;
1-(4-trifluoromethylphenyl)-5-(4-chloro-3-trifluoromethylphenyl)-3-formazancarbonitrile;
1-(4-trifluoromethylphenyl)-5-(2-chloro-5-trifluoromethylphenyl)-3-formazancarbonitrile;
1-(4-trifluoromethylphenyl)-5-(2,6-difluorophenyl)-3-formazancarbonitrile;
1-(4-trifluoromethylphenyl)-5-(3-nitrophenyl)-3-formazancarbonitrile;
1-(4-trifluoromethylphenyl)-5-(4-nitrophenyl)-3-formazancarbonitrile;
1-(4-trifluoromethylphenyl)-5-(2,4,6-trichlorophenyl)-3-formazancarbonitrile;
1-(4-trifluoromethylphenyl)-5-(3-trifluoromethylphenyl)-3-formazancarbonitrile;
1-(4-trifluoromethylphenyl)-5-(3-bromophenyl)-3-formazancarbonitrile;
1-(4-trifluoromethylphenyl)-5-(4-bromophenyl)-3-formazancarbonitrile;
1-(4-trifluoromethylphenyl)-5-(3-fluorophenyl)-3-formazancarbonitrile;
1-(4-trifluoromethylphenyl)-5-(3-chlorophenyl)-3-formazancarbonitrile;
1-(4-trifluoromethylphenyl)-5-(4-isopropylphenyl)-3-formazancarbonitrile;
1,5-bis-(3,4-dichlorophenyl)-3-formazancarbonitrile, potassium salt.

This invention includes a method of controlling insects by application of a compound of Formula I, and formulations thereof. Such formulations consist essentially of an inert diluent and/or a surfactant and means for insect control selected from the compounds of this invention.

By control by applying, it is meant application to the locus of infestation, to the area to be protected or to the insects themselves.

DETAILED DESCRIPTION OF THE INVENTION

This invention is directed to certain substituted 1,5-diphenyl-3-formazancarbonitrile compounds and their use for controlling insects.

In identifying the above compounds, the nomenclature used throughout is based on one tautomer as expressed in the structure of Formula I, repeated as follows:

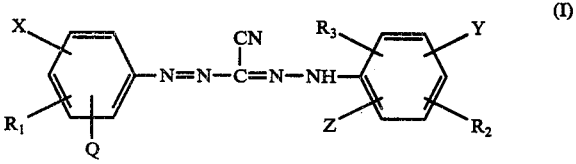

It is to be understood, however, that this nomenclature is intended to include the tautomers of Formulas Ia and Ib, as shown below, as well as mixtures of these tautomers and the cis and trans or syn and anti isomers that result from the double bonds.

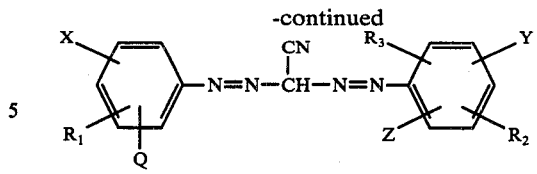

and

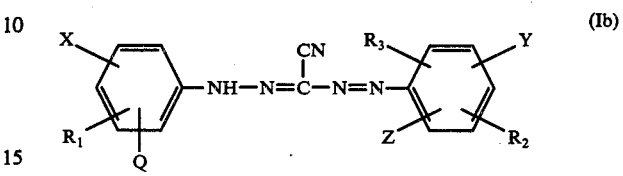

The same nomenclature applied to the compounds of Formula I is applicable to the novel compounds of Formula II, all of which are encompassed by Formula I.

Agriculturally suitable salts of the compounds of Formula I also are useful in controlling insects. Preferred salts are those wherein the cation is lithium, potassium or sodium.

The invention relates to compounds useful in controlling insects. These compounds are defined in Formula I:

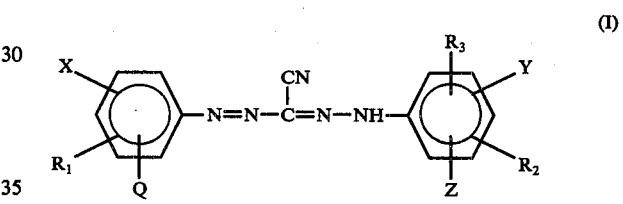

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;
$R_1$ is hydrogen, chlorine, bromine, fluorine, or trifluoromethyl;
$R_2$ is hydrogen, chlorine, bromine, fluorine or trifluoromethyl;
$R_3$ is hydrogen, chlorine, bromine, fluorine, trifluoromethyl or nitro;
Z is hydrogen, chlorine, bromine, or fluorine, and Q is hydrogen, chlorine, bromine, or fluorine, provided
  1. when Y is alkyl of 1–4 carbon atoms, X is trifluoromethyl;
  2. when X is 4-chloro, 4-bromo, or 4-fluoro, and $R_1$, Q, and three of $R_2$, Z, Y, and $R_3$ are hydrogen, then the remainder $R_2$, Z, Y, and $R_3$ must be other than 4-chloro, 4-bromo, or 4-fluoro;
  3. when X is nitro, $R_3$ must be other than hydrogen; and
  4. when X is halogen, at least one of $R_1$, $R_2$, $R_3$, Q, Y and Z must be other than hydrogen and the agriculturally suitable salts thereof.

Preferred for their higher activity from among the compounds above of formula I are the compounds wherein X is trifluoromethyl, chlorine, bromine, pentafluoroethoxy, or nitro;
Y is hydrogen, trifluoromethyl, chlorine, bromine, fluorine or pentafluoroethoxy or branched alkyl of 3 or 4 carbon atoms;
$R_1$ is hydrogen, chlorine, bromine, or trifluoromethyl;
$R_2$ is hydrogen, chlorine, bromine, or trifluoromethyl;
$R_3$ is hydrogen;
Z is hydrogen or chlorine; and
Q is hydrogen or chlorine, provided
  1. when Y is branched alkyl of 3 or 4 carbon atoms, X is trifluoromethyl;
  2. when X is halogen, no more than one of $R_1$, $R_2$ and Y can be hydrogen; and
  3. when X is nitro, Y is other than hydrogen.

Also preferred for high insecticidal activity from among the compounds of Formula I are those compounds of Formula II:

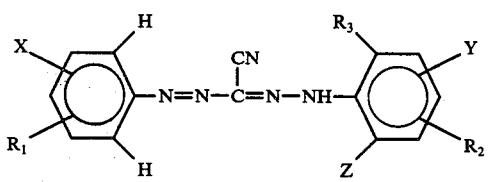

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine, or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;
$R_1$ is hydrogen, chlorine, bromine, or trifluoromethyl;
$R_2$ is hydrogen, chlorine, bromine, or trifluoromethyl;
$R_3$ is hydrogen, chlorine, bromine, fluorine, trifluoromethyl, or nitro;
Z is hydrogen, chlorine, bromine, or fluorine; provided
  1. when Y is alkyl of 1–4 carbon atoms, X is trifluoromethyl;
  2. when $R_3$ is nitro, X must be trifluoromethyl;
  3. when X is 4-chloro, 4-bromo, or 4-fluoro, and $R_1$, $R_3$, Z and one of $R_2$ and Y are hydrogen, then the remainder of $R_2$ and Y must be other than 4-chloro, 4-bromo or 4-fluoro; and
  4. when X is nitro, Y is trifluoromethyl.

More preferred for their higher insecticidal activity are those compounds of Formula II where
X is trifluoromethyl, chlorine, bromine, pentafluoroethoxy or nitro;
Y is hydrogen, trifluoromethyl, chlorine, bromine, fluorine, pentafluoroethoxy or branched alkyl of 3 or 4 carbon atoms;
$R_1$ is hydrogen, chlorine, bromine or trifluoromethyl;
$R_2$ is hydrogen, chlorine, bromine or trifluoromethyl;
$R_3$ is hydrogen; and
Z is hydrogen, provided that
  1. when Y is branched alkyl of 3 or 4 carbon atoms, X is trifluoromethyl;
  2. when X is halogen, no more than one of $R_1$, $R_2$ and Y can be hydrogen; and
  3. when X is nitro, Y is trifluoromethyl.

Also preferred for the same reasons are those compounds of Formula II wherein
X is trifluoromethyl, chlorine, bromine or pentafluoroethoxy;
Y is hydrogen, chlorine, bromine, fluorine, pentafluoroethoxy or branched alkyl of 3 or 4 carbon atoms;
$R_1$ is hydrogen, chlorine or bromine;
$R_2$ is hydrogen, chlorine or bromine; and
$R_3$ and Z are each hydrogen; provided that
  1. when Y is branched alkyl of 3 or 4 carbon atoms, X is trifluoromethyl;
  2. when X is halogen, no more than one of $R_1$, $R_2$ and Y can be hydrogen;

Again equally preferred for the same reasons are those compounds of Formula II wherein:
X is chlorine, bromine, or pentafluoroethoxy;
Y is hydrogen, chlorine, bromine, fluorine or pentafluoroethoxy;
$R_1$ is hydrogen, chlorine, or bromine;
$R_2$ is hydrogen, chlorine, or bromine; and
$R_3$ and Z are each hydrogen;
provided that when X is halogen, no more than one of $R_1$, $R_2$ and Y can be hydrogen.

More preferred for their even higher insecticidal activity are those compounds of Formula II wherein
X is trifluoromethyl;
Y is hydrogen, trifluoromethyl, chlorine or bromine;
$R_1$ is hydrogen, chlorine, or bromine;
$R_2$ is hydrogen, chlorine or bromine;
$R_3$ and Z are each hydrogen.

Even more preferred for their higher insecticidal activity and ease of synthesis are those compounds of Formula II wherein:
X is chlorine or bromine;
Y is chlorine or bromine;
$R_1$ is hydrogen, chlorine or bromine;
$R_2$ is chlorine or bromine; and
$R_3$ and Z are each hydrogen.

Certain of the compounds of Formula I are novel. These compounds are represented by Formula II, and their suitable agricultural salts. The preferred salts being the lithium, potassium and sodium salts.

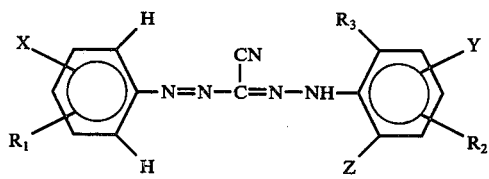

The novel compounds are the compounds of Formula II wherein
X is trifluoromethoxy, trifluoromethylthio, 1,1,2,2-tetrafluoromethoxy, 1,1,2,2-tetrafluoroethylthio, pentafluoroethoxy, pentafluoroethylthio, pentafluorothio, cyano, trifluoromethyl, chlorine, bromine, fluorine or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1-4 carbon atoms;

$R_1$ is hydrogen, chlorine, bromine, fluorine or trifluoromethyl;

$R_2$ is hydrogen, chlorine, bromine, fluorine or trifluoromethyl;

$R_3$ is hydrogen, chlorine, bromine, fluorine, trifluoromethyl, or nitro;

Z is hydrogen, chlorine, bromine, or fluorine, provided
1. when X is nitro at least one of Y or $R_3$ must be trifluoromethyl;
2. when Y is alkyl of 1-4 carbon atoms, X is trifluoromethyl;
3. when $R_3$ is nitro, X is trifluoromethyl; and
4. when X is halogen, no more than three of $R_1$, $R_2$, $R_3$, Z and Y can be hydrogen, and the agriculturally suitable salts thereof.

Also equally preferred are novel compounds of Formula II wherein:

X is trifluoromethyl, chlorine, bromine, 4-pentafluoroethoxy, or nitro;

Y is hydrogen, trifluoromethyl, chlorine, bromine, fluorine, 4-pentafluoroethoxy, or branched alkyl of 3 or 4 carbon atoms;

$R_1$ is hydrogen, chlorine or bromine;

$R_2$ is hydrogen, chlorine or bromine; and $R_3$ and Z are both hydrogen, provided
1. when X is halogen, no more than one of $R_1$, $R_2$ and Y can be hydrogen;
2. when Y is branched alkyl of 3 or 4 carbon atoms, X is trifluoromethyl; and
3. when X is nitro, Y is trifluoromethyl.

Preferred are the novel compounds of Formula II wherein:

X is trifluoromethyl, chlorine, bromine, or 4-pentafluoroethoxy;

Y is hydrogen, chlorine, bromine, fluorine, 4-pentafluoroethoxy or branched alkyl of 3 or 4 carbon atoms;

$R_1$ is hydrogen, chlorine, or bromine;

$R_2$ is hydrogen, chlorine or bromine; and $R_3$ and Z are both hydrogen, provided
1. when X is halogen, no more than one of $R_1$, $R_2$ and Y can be hydrogen; and
2. when Y is branched alkyl of 3 or 4 carbon atoms, X is trifluoromethyl.

Preferred are the novel compounds of Formula II wherein:

X is chlorine, bromine or 4-pentafluoroethoxy;

Y is hydrogen, chlorine, bromine, fluorine or 4-pentafluoroethoxy;

$R_1$ is hydrogen, chlorine or bromine;

$R_2$ is hydrogen, chlorine or bromine; and $R_3$ and Z are both hydrogen, provided when X is halogen, no more than one of $R_1$, $R_2$ and Y can be hydrogen.

More preferred for their high activity and ease of synthesis are the novel compounds of Formula II wherein:

X is trifluoromethyl;

Y is trifluoromethyl, hydrogen, chlorine or bromine;

$R_1$ is hydrogen, chlorine or bromine;

$R_2$ is hydrogen, chlorine or bromine; and $R_3$ and Z are hydrogen.

Even more preferred for their ease of synthesis are the novel compounds of Formula II wherein:

X is chlorine or bromine;

Y is chlorine or bromine;

$R_1$ is hydrogen, chlorine or bromine;

$R_2$ is chlorine or bromine; and $R_3$ and Z are both hydrogen.

METHOD OF PREPARATION

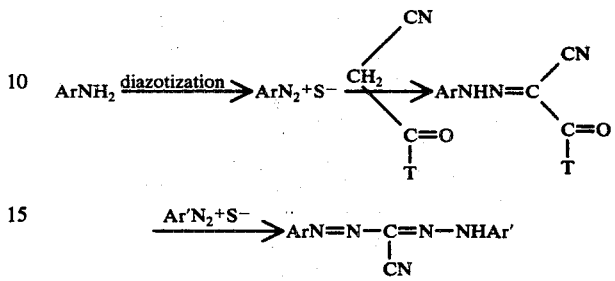

wherein T = OH, OR, NHR and R = H or alkyl of 1-4 carbon atoms and S = Cl, $HSO_4$, $H_2PO_4$ or other counter ions corresponding to the acid used in preparation of the amine salt.

The methods of preparation of 1,5-diphenyl-3-formazancarbonitrile are well known in the art. Symmetrically substituted 1,5-diphenyl-3-formazancarbonitriles (Ar = Ar') can be prepared by coupling of 2 moles of diazonium salt with 1 mole of an active methylene compound having a cyano and a carboxy, carboalkoxy, or carboamido group. The diazonium salt is prepared by diazotization of the appropriate aromatic amine. The intermediate substituted phenylhydrazone may be isolated, but normally with symmetrical formazans it is more practical and convenient to couple two equivalents of diazonium salt with one equivalent of active methylene compound without isolation of the hydrazone. The symmetrical formazans precipitate and are readily isolated by filtration.

Unsymmetrical formazans (Ar ≠ Ar') are prepared from 1 mole of active methylene compound and 2 moles of diazonium salt, $ArN_2^+S^-$ and $Ar'N_2^+S^-$ where Ar ≠ Ar'.

The intermediate hydrazone of either diazonium salt may be prepared, isolated, purified, redissolved, and reacted with 1 mole of the other diazonium salt. For convenience and practicality, the hydrazone need not be isolated. In this case, one equivalent of the diazonium salt can be reacted with one equivalent of the active methylene compound and after a suitable increase of pH, a second mole of the other diazonium salt can be reacted while maintaining the desired pH range. The unsymmetrical formazans precipitate and are readily isolated by filtration.

In either of the above preparations, after aqueous washing to remove salts, the product formazans are usually of 90% or greater purity. It is preferred for highest insecticidal activity to use the product isolated directly from the reaction mixture. Alternatively, the product can be further purified by recrystallization from a suitable solvent system such as acetone, acetonewater, chloroform, or acetonitrile. In some cases, recrystallization from an organic solvent or mixture of organic solvents and water results in material having lower insecticidal activity than the crude product.

Diazotization

The diazotizations are preferably carried out in strongly acidic aqueous media. In cases where amine or diazonium salts are sparingly soluble in water, it is often desirable to use a combination of water and organic solvents. Preferred are water-miscible solvents such as alcohols, ethers, or organic acid, e.g., methanol, ethanol, tetrahydrofuran, dioxane, ethylene glycol, and acetic acid. For some weakly basic amines, strong acids such as conc. sulfuric, phosphoric or aqueous hydrochloric (40%) acids are needed and have been used.

Diazotization temperatures may range from −20° to 100° C, preferably 0° to 40°.

The nitrosating agents are many as known in the art. e.g., nitrous acid, nitrosylsulfuric acid, nitrogen tetroxide, alkyl nitrites, and a variety of reagent which generate nitrous acid. The preferred nitrosating agents are nitrous acid and nitrogen tetroxide. One equivalent or a slight excess of nitrosating reagent per amine eqivalent is preferred.

Pressure is not a critical variable in the process of this invention. Pressures above and below atmospheric pressure may be used, atmospheric pressure being preferred for convenience.

Coupling Steps (Symmetrical Formazans)

The coupling of diazonium salts and active methylene compounds are normally carried out and preferred in aqueous media. In cases where diazonium salts are sparingly soluble in water, it is often desirable to use a combination of water and organic solvents. Preferred are water-miscible solvents such as alcohols, ethers or organic acids, e.g., methanol, ethanol, tetrahydrofuran, dioxane, ethylene glycols, and acetic acid.

Coupling between diazonium salts and the active methylene compounds occurs at pH 2 to 12. The intermediate hydrazone may be isolated in the pH range of 2 to 6.5, preferably at 4 to 6, and is consequently coupled with a second mole of diazonium salt at pH 7 to 12, preferably 7.5 to 10. Normally with symmetrical formazans, it is more practical and convenient to couple two equivalents of diazonium salts with one equivalent of active methylene compond at pH 7 to 12, preferably 7.5 to 10, without isolation of intermediate hydrazone. The pH of the reaction mixture can be controlled by use of a suitable buffer such as potassium monobasic phosphate-potassium hydroxide or sodium acetate-sodium hydroxide or by simultaneous or subsequent addition of a suitable base such as sodium hydroxide.

The temperature of the coupling steps may range from −20° to 100° C., preferably 0° to 40°.

Two equivalents or slight excess of diazonium salt per equivalent of active methylene compound is preferred.

Pressure is not a critical variable in the process of this invention. Pressures above and below atmospheric pressure may be used, atmospheric pressure being preferred for convenience.

Coupling Step (Unsymmetrical Formazans - Isolation of Substituted Phenyl Hydrazone)

The coupling of diazonium salts and active methylene compounds are normally carried out and preferred in aqueous media. In cases where diazonium salts are sparingly soluble in water, it is often desirable to use a combination of water and organic solvents. Preferred are water-miscible solvents such as alcohols, ethers or organic acids, e.g., methanol, ethanol, tetrahydrofuran, dioxane, ethylene glycols, and acetic acid.

When the substituted phenyl hydrazones are isolated, the pH of the reaction mixture is held at 2 to 6.5, preferably at 4 to 6.

Excess active methylene compound may be used but it is preferred to have a 1:1 mole ratio or slight excess of active methylene compound compared to diazonium salt.

The phenyl hydrazones are normally water insoluble, can be isolated by filtration, and can be used directly in the subsequent coupling step. Alternatively, the product can be further purified by recrystallization by a suitable solvent system such as acetone, acetone-water, chloroform, or acetonitrile.

In the second coupling step, the hydrazone or its alkali metal salt is dissolved in a suitable solvent system such as water, methanol, ethanol, tetrahydrofuran, dioxane, ethylene glycol and combinations thereof, and is reacted with one equivalent or slight excess of the other diazonium salt with the pH control at 7 to 12, preferably 7.5 to 10.

The temperature of either coupling steps may range from −20° to 100° C, preferably 0° to 40°

Coupling Step (Unsymmetrical Forazan - Without Isolation of Substituted Phenyl Hydrazone)

The process variables and conditions are the same as described for the above unsymmetrical formazan preparation. However, the intermediate substituted phenyl hydrazone is not isolated. Rather, the pH is raised to 7 to 12, preferably 7.5 to 10, and it is coupled directly with the other diazonium salt. Under these conditions it is preferred that excess active methylene compound be avoided.

The process of preparing 1,5-diphenyl-3-formazan - carbonitriles can be batch or continuous.

The following examples illustrate preparation of the compounds of Formula I and Formula II. In each of these examples cyanoacetic acid or its esters may be used in place of cyanoacetamide. Parts and percentages are by weight unless otherwise noted. Temperatures are in degrees Centigrade unless otherwise noted.

EXAMPLE 1

1.5-bis(4-Trifluoromethylphenyl)-3-formazancarbonitrile

A solution of 16.1 g (0.1 mole) p-aminobenzotrifluoride in 30 ml of 12N hydrochloric acid diluted with 300 ml of water is cooled to 0° by adding crushed ice until the volume of the solution is 500 ml. A solution of 7.0 g (0.1 mole) of sodium nitrite in 70 ml water is then added to the above with stirring. A solution of 4.2 g (0.05 mole) of cyanoacetamide in 50 ml water is added thereafter and the resulting mixture is poured into 450 ml of 1 molar $NaH_2PO_4$ buffer solution of pH 7.5, yielding an orange solid within the solution. The pH of the solution is then adjusted to 7.5 by adding 100 ml of a 10% sodium hydroxide solution. Carbon dioxide is evolved. Collection of the orange solid product is accomplished by filtration, the yield of crude product being quantitative. After recrystallization from acetone, the orange-red compound melted at 232°–234° and was identified as 1,5-bis(4-trifluoromethylphenyl) -3-formazancarbonitrile.

EXAMPLE 2

1,5-bis(4-Trifluoromethylphenyl)-3-formazancarbonitrile

A solution of p-aminobenzotrifluoride (120.8 g; 0.75 mole, bp 117.5°/60 mm, $n_D^{25}$ 1.4815) in 12N HCl diluted with water (1167 ml) and methanol (335 ml) is filtered to remove a small amount of insoluble material. Crushed ice is added to the filtrate to cool the solution to 0°–5°. Sodium nitrite (52.5 g, 0.76 mole) in water (100 ml) is added rapidly and the solution stirred at 0°–5° for 10 minutes. The resulting diazonium salt solution is added slowly to a stirred solution of cyanoacetamide (31.5 g, 0.37 mole) in a potassium monobasic phosphate sodium hydroxide buffer (pH 8.65; 666 ml) while simultaneously adding aqueous 10% sodium hydroxide at a rate to maintain pH 8.5 to 9.0.

When addition is complete, the orange-red suspension was stirred 10-20 minutes and filtered. The filter cake was washed with water until free of salts and then dried to give orange-red solid 1,5-bis(4-trifluoromethylphenyl)-3-formazancarbonitrile (144 g; mp 227°–230°). This material showed excellent insect control without further purification.

By using the appropriately substituted aniline in place of p-aminobenzotrifluoride in either the method of Example 1 or the method of Example 2, the symmetrically substituted compounds of Formulas I and II listed in Table I can be prepared.

TABLE I

| X | $R_1$ | Y | $R_2$ | $R_3$ | Z | m.p. |
|---|---|---|---|---|---|---|
| 4-HF$_2$CCF$_2$O— | H | 4-HF$_2$CCF$_2$O— | H | H | H | 198–201 |
| 4-CF$_3$S— | H | 4-CF$_3$S— | H | H | H | 200–203 |
| 4-F$_5$C$_2$O— | H | 4-F$_5$C$_2$O— | H | H | H | 210–212 |
| 4-F$_5$S— | H | 4-F$_5$S— | H | H | H | 181–185 |
| 4-CF$_3$O— | H | 4-CF$_3$O— | H | H | H | 214 |
| 3-CF$_3$S— | H | 3-CF$_3$S— | H | H | H | 141–145 |
| 3-F$_5$C$_2$O— | H | 3-F$_5$C$_2$O— | H | H | H | 136–139 |
| 3-HCF$_2$—CF$_2$—S— | H | 3-HCF$_2$CF$_2$—S— | H | H | H | 158–161 |
| 3-HF$_2$CF$_2$C—O— | H | 3-HCF$_2$CF$_2$O— | H | H | H | 146–149 |
| 3-F$_5$S— | H | 3-F$_5$S— | H | H | H | 157–160 |
| 3-CF$_3$— | H | 3-CF$_3$— | H | H | H | 142–149 |
| 3-Chloro | H | 3-Chloro | H | H | H | 231 |
| 3-CF$_3$ | 4-Cl | 3-CF$_3$ | 4-Cl | H | H | 198–203 |
| 3-Cl | 4-Cl | 3-Cl | 4-Cl | H | H | 244–247 |
| 3-Cl | 5-Cl | 3-Cl | 5-Cl | H | H | 259–262 |
| 3-Br | 4-Cl | 3-Br | 4-Cl | H | H | |
| 3-Cl | 4-Br | 3-Cl | 4-Br | H | H | |
| 3-Br | 4-Br | 3-Br | 4-Br | H | H | |
| 3-Br | 5-Br | 3-Br | 5-Br | H | H | |
| 3-CF$_3$ | 4-Br | 3-CF$_3$ | 4-Br | H | H | |
| 4-F$_5$C$_2$S | H | 4-F$_5$C$_2$S | H | H | H | |
| 4-Cl | 3-F | 4-Cl | 3-F | H | H | |
| 4-F | 3-Br | 4-F | 3-Br | H | H | |

| X | $R_1$ | Q | Y | $R_2$ | $R_3$ | Z | m.p. |
|---|---|---|---|---|---|---|---|
| 4-Cl | 2-Cl | 6-Cl | 4-Cl | H | 2-Cl | 6-Cl | 132–138 |
| 4-Cl | 2-Cl | 5-Cl | 4-Cl | H | 2-Cl | 5-Cl | 237–240 |
| 2-CF$_3$ | 4-Cl | H | 2-CF$_3$ | 4-Cl | H | H | 180–183 |
| 4-Cl | H | 2-Cl | 4-Cl | H | H | 2-Cl | 188–191 |
| 5-Cl | 2-Cl | H | 5-Cl | 2-Cl | H | H | 202–205 |
| 5-CF$_3$ | H | 2-Cl | 5-CF$_3$ | H | H | 2-Cl | 127–130 |
| 5-CF$_3$ | H | 2-F | 5-CF$_3$ | H | H | 2-F | 154–158 |
| 4-F | 2-CF$_3$ | H | 4-F | H | 2-CF$_3$ | H | 183–187 |
| 3-NO$_2$ | 4-Cl | H | H | 4-Cl | 3-NO$_2$ | H | 239–243 |

TABLE I-continued

| | | | | | | | |
|---|---|---|---|---|---|---|---|
| 3-CF$_3$ | 5-CF$_3$ | H | 3-CF$_3$ | 5-CF$_3$ | H | H | 221–224 |
| H | 2-Cl | 6-Cl | H | 2-Cl | H | 6-Cl | 156–159 |
| 4-Br | H | 2-Br | 4-Br | H | H | 2-Br | 183–189 |
| 5-Br | 2-Br | H | 5-Br | 2-Br | H | H | 210–215 |
| 4-Br | H | 2-Cl | 4-Br | H | H | 2-Cl | 198–204 |
| 4-F | H | 2-F | 4-F | H | H | 2-F | 174–179 |
| 2-CF$_3$ | H | H | 2-CF$_3$ | H | H | H | 121–125 |
| 2-OCF$_3$ | H | H | 2-OCF$_3$ | H | H | H | 111–115 |
| 3-F | H | H | 3-F | H | H | H | 208–209 |
| 4-Cl | H | H | 4-Cl | H | H | H | 242–245 |
| 4-NO$_2$ | H | H | H | H | 4-NO$_2$ | H | 219 (dec) |

EXAMPLE 3

1-(4-Trifluoromethoxyphenyl)-5-phenyl-3-formazan-carbonitrile

A solution of 9.3 g (0.1 mole) of aniline in 16.6 ml 12N HCl diluted with 150 ml of water is cooled to 0° C and diazotized by addition of a solution of 6.9 g sodium nitrite in 50 ml water. This solution is poured slowly into a solution of 13.8 g (0.165 moles) of cyanoacetamide and 15 g potassium acetate in 200 ml water. A yellow solid precipitate of C$_6$H$_5$NHN=C(CN)CONH$_2$ forms, and is isolated by filtration and dried by (1) refluxing with benzene and (2) separating the benzene-water azeotrope until no more water appears in the distillate. The product is removed from the benzene suspension by filtration and characterized by examination of its IR spectrum.

A solution of 4.7 g (0.025 moles) of the C$_6$H$_5$NHN=C(CN)CONH$_2$ in 25 ml of 1N sodium hydroxide plus 25 ml methanol is then prepared. A solution of 4.43 g (0.025 moles) of p-trifluoromethoxyaniline in 75 ml of 1N HCl is prepared and cooled to 0° and then diazotized by addition of a solution of 1.75 g sodium nitrite in 20 ml water. This diazonium solution is poured into the stirred hydrazone solution and 25 ml of 1N NaOH is added. An orange precipitate is formed, and the pH of the solution at this time is 7.6. This solid is removed by filtration, and the filter-cake is dissolved in chloroform. This solvent is removed. The residue is recrystallized from n-butyl chloride to give a first crop of 3.0 g bright red crystals, m.p. 183°–184° identified as 1-(4-trifluoromethoxyphenyl)-5-phenyl-3-formazancarbonitrile.

By the above sequence of procedures, or known modifications thereof, using the appropriate substituted anilines in place of aniline and p-trifluoromethoxyaniline, the asymmetrically substituted compounds of Formulas I and II, listed in Table II, can be prepared.

TABLE II

| X | R$_1$ | Y | R$_2$ | R$_3$ | Z | m.p. |
|---|---|---|---|---|---|---|
| 3-Cl | 4-Cl | H | H | 2-Cl | 6-Cl | 155–163 |
| 3-Cl | 4-Cl | 4-Cl | H | 2-Cl | H | 183–187 |
| 3-Cl | 4-Cl | 4-Cl | H | 2-Cl | 6-Cl | 140–150 |
| 3-CF$_3$ | 4-Cl | 3-Cl | 4-Cl | H | H | 233–238 |
| 3-Cl | 5-Cl | H | H | H | H | 229–235 |
| 4-CN | H | 4-Cl | H | H | H | 264–267 |
| 4-Cl | H | 4-Cl | H | 2-Cl | 6-Cl | 210–215 |
| 3-Cl | 4-Cl | 4-Cl | H | H | H | 239–243 |
| 3-Cl | 4-Cl | 3-Cl | 5-Cl | H | H | 230–235 |
| 3-Cl | 4-Cl | 3-F | H | H | H | 218–223 |
| 3-CF$_3$ | 4-Cl | 4-Cl | H | H | H | 235–240 |
| 3-Cl | 4-Cl | H | H | 2-Cl | H | 170–175 |
| 3-Cl | 4-Cl | H | H | 2-CF$_3$ | H | 150–156 |
| 4-CN | H | 3-Cl | 5-Cl | H | H | 247–253 |
| 3-Cl | 5-Cl | 4-Cl | H | H | H | 240–245 |
| 3-Cl | 5-Cl | H | H | 2-Cl | H | 125–130 |
| 3-CF$_3$ | H | 4-F | H | H | H | 176 |
| 4-CN | H | 3-CF$_3$ | H | H | H | 250 |
| 3-CF$_3$ | H | H | H | 2-F | H | 140–145 |
| 3-CF$_3$ | H | H | H | 2-Cl | H | 130 |
| 3-CF$_3$ | H | 4-Cl | H | 2-Cl | 6-Cl | 181 |
| 3-Cl | H | H | H | 2-CF$_3$ | H | 92–102 |
| 4-Cl | H | H | H | 2-CF$_3$ | H | 163–173 |
| 4-CN | H | H | H | 2-CF$_3$ | H | 132–137 |
| 3-Cl | 5-Cl | H | H | 2-CF$_3$ | H | 168–178 |
| 4-CN | H | 3-Cl | H | H | H | 205–209 |
| 3-CF$_3$ | 4-Cl | 3-Cl | H | H | H | 225–229 |
| 3-Cl | H | 3-Cl | 5-Cl | H | H | 213–217 |
| 3-Cl | H | 3-Cl | 4-Cl | H | H | 209–213 |

TABLE II-continued

| X | R1 | Y | R2 | R3 | Z | m.p. |
|---|---|---|---|---|---|---|
| 3-CF3 | 4-Cl | 4-isopropyl | H | H | H | 146-152 |
| 3-CF3 | 4-Cl | 3-Cl | 5-Cl | H | H | 190-195 |
| 4-CF3 | H | 3-F | H | H | H | 200-204 |
| 4-CF3 | H | 3-Cl | H | H | H | 120-122 |
| 4-CF3 | H | 4-isopropyl | H | H | H | 188-192 |
| 4-CF3 | H | H | H | 2-CF3 | H | 163-173 |
| 4-CF3 | H | H | H | 2-F | 6-F | |
| 3-CF3 | H | 4-Cl | H | H | H | 194-197 |
| 3-CF3 | H | 3-Cl | 5-Cl | H | H | 212 |
| 3-CF3 | H | 3-Cl | 4-Cl | H | H | 209 |
| 3-CF3 | H | 3-Cl | H | H | H | 198-204 |
| 3-CF3 | H | 3-CF3 | H | 2-Cl | H | 264 |
| 3-CF3 | H | 3-CF3 | 4-Cl | H | H | 166-172 |
| 3-CN | H | 3-CF3 | H | H | H | 231-246 |
| 3-CF3 | H | 4-Br | H | H | H | 190-195 |
| 4-NO2 | H | 3-CF3 | H | H | H | 185-196 |
| 3-CF3 | H | H | H | 2-F | 6-F | 105 |
| 3-CF3 | H | 3-F | H | H | H | 175-178 |
| 4-CF3 | H | H | H | H | H | 217-221 |
| 4-CF3 | H | 4-CH3 | H | H | H | 246-247 |
| 4-CF3 | H | 4-Cl | H | H | H | 291-292 |
| 4-CF3 | H | 3-Cl | 5-Cl | H | H | 267-268 |
| 4-CF3 | H | 4-Cl | H | 2-Cl | 6-Cl | 210 |
| 4-CF3 | H | 3-Cl | 4-Cl | H | H | 211-213 |
| 4-CF3 | H | 3-CF3 | 4-Cl | H | H | 198 |
| 4-CF3 | H | 5-CF3 | H | 2-Cl | H | 201 |
| 4-CF3 | H | 3-CF3 | H | H | H | 172 |
| 4-CF3 | H | H | H | 2-NO2 | H | 161-162.5 |
| 3-NO2 | H | 4-CF3 | H | H | H | 187-190 |
| 4-NO2 | H | 4-CF3 | H | H | H | 199-204 |
| 4-CF3 | H | H | H | 2-Br | H | 117 |
| 4-CF3 | H | 3-Br | H | H | H | 179-183 |
| 4-CF3 | H | 4-Br | H | H | H | 243-243.5 |
| 4-CF3 | H | H | H | 2-F | H | 201-202.5 |
| 4-CN | H | 3-Cl | 4-Cl | H | H | 248-251 |
| 3-CF3 | H | H | H | 2-CF3 | H | 105 |
| 4-CF3 | H | 3-Br | 4-Br | H | H | |
| 4-CF3 | H | 4-F | H | H | H | |
| 4-CF3 | H | H | H | 2-Cl | H | |
| 3-CF3 | H | 3-Br | H | H | H | |
| 3-CF3 | H | H | H | 2-Br | H | |
| 3-CF3 | H | 4-Br | 3-Br | H | H | |
| 3-CF3 | H | 4-Cl | 3-Br | H | H | |
| 3-CN | H | 3-CF3 | H | H | H | |
| 4-CF3 | H | 4-t-butyl | H | H | H | |
| 3-CF3 | H | 4-t-butyl | H | H | H | |
| 4-CF3 | H | 4-sec-butyl | H | H | H | |
| 3-CF3 | H | 4-sec-butyl | H | H | H | |
| 3-CF3 | H | H | H | 2-Cl | 6-Cl | |
| 4-CF3 | H | H | H | 2-Cl | 6-Cl | |
| 3-CF3 | H | H | H | 2-Br | 6-Br | |
| 4-CF3 | H | H | H | 2-Br | 6-Br | |
| 3-Cl | 4-Cl | 4-Br | H | H | H | |
| 3-Cl | 4-Cl | 4-F | H | H | H | |
| 3-Cl | 4-Cl | 3-Br | H | H | H | |
| 4-CN | H | 4-CF3 | H | H | H | |
| 3-CN | H | 4-CF3 | H | H | H | |
| 3-CN | H | 3-Cl | H | H | H | |
| 3-CF3 | 4-Cl | 3-Br | H | H | H | |
| 3-CF3 | 4-Cl | 4-Br | H | H | H | |
| 3-Cl | 4-Cl | H | H | 2-F | H | |
| 3-Cl | 4-Cl | H | H | H | H | |
| 3-Cl | 4-Cl | 3-Br | 4-Br | H | H | |
| 3-Cl | 5-Cl | 4-F | H | H | H | |
| 3-CN | H | 3-Cl | 4-Cl | H | H | |
| 3-CN | H | 3-Cl | H | H | H | |
| 3-Cl | H | 4-Cl | H | 2-Cl | 6-Cl | |
| 4-CF3O | H | H | H | H | H | |

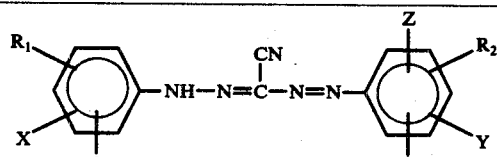

| X | R1 | Q | Y | R2 | R3 | Z | m.p. |
|---|---|---|---|---|---|---|---|
| 3-CF3 | H | H | H | H | 2-NO2 | H | 175d |
| 4-CF3 | H | H | 3-CF3 | 5-CF3 | H | H | 183-220 |
| 3-Cl | H | H | H | H | 2-Cl | H | 155-8 |
| 3-Cl | H | H | 4-Cl | H | H | H | 212-216 |
| 3-NO2 | H | H | H | H | 3-Cl | H | 210-214 |
| 3-NO2 | H | H | 3-Cl | H | 5-Cl | H | 217-223 |
| 3-Cl | 4-Cl | H | H | H | 2-NO2 | H | 168-173 |
| 3-NO2 | H | H | H | 4-Cl | 3-Cl | H | 205-210 |
| 4-NO2 | H | H | H | 4-Cl | 3-Cl | H | 239-243 |
| 4-NO2 | H | H | H | H | 4-Cl | H | 245-250 |
| 3-NO2 | H | H | H | H | 4-Cl | H | 232-237 |

TABLE II-continued

| | | | | | | | |
|---|---|---|---|---|---|---|---|
| 4-Cl | H | H | 4-Cl | H | 2-Cl | H | 187–192 |
| 4-Cl | H | H | 4-Cl | 6-Cl | 2-Cl | H | 243–248 |
| 3-NO$_2$ | H | H | 4-Cl | 6-Cl | 2-Cl | H | 77–79 |
| 4-NO$_2$ | H | H | 4-Cl | 6-Cl | 2-Cl | H | 73–75 |
| H | H | 2-Cl | H | H | 2-Cl | 6-Cl | 145–149 |
| 2-CF$_3$ | H | H | H | H | 2-Cl | H | 168–178 |
| 2-CF$_3$ | H | H | H | H | 3-NO$_2$ | H | 155–165 |
| 4-CF$_3$ | H | H | H | H | 2-CF$_3$ | H | 163–173 |
| 2-CF$_3$ | H | H | H | H | H | H | 125–130 |
| 3-CF$_3$ | H | H | 3-CF$_3$ | 5-CF$_3$ | H | H | 168–200 |
| 3-CF$_3$ | H | H | H | H | H | H | 174–176 |
| 3-CF$_3$ | H | H | 4-F | H | 2-CF$_3$ | H | 134–138 |
| 3-CF$_3$ | H | H | 3-CF$_3$ | 4-F | H | H | 150–153 |
| 3-CF$_3$ | H | H | 3-CF$_3$ | H | 2-F | H | 130–138 |
| 3-CF$_3$ | H | H | 3-CF$_3$ | 4-Br | H | H | 133–135 |
| 3-CF$_3$ | H | H | H | 4-BY | 2-CF$_3$ | H | 132–150 |
| 3-CF$_3$ | H | H | 5-CF$_3$ | H | 2-BY | H | 132–50 |
| 3-CF$_3$ | H | H | 4-CF$_3$ | H | 2-NO$_2$ | H | 101–107 |
| 3-CF$_3$ | H | H | 2-CF$_3$ | H | 4-NO$_2$ | H | 240–265 |
| 3-CF$_3$ | H | H | 3-CF$_3$ | 4-Cl | H | H | 155–168 |
| 3-NO$_3$ | H | H | H | H | 3-CF$_3$ | H | 155–8 |
| H | 2-Cl | H | H | H | 2-F | H | 139–144 |
| 2-CN | H | H | H | H | 2-Cl | H | 156–160 |
| 2-NO$_2$ | H | H | H | 6-Cl | 2-Cl | H | 191–195 |
| 2-CF$_3$ | H | H | H | H | 2-NO$_2$ | H | 185–190 |
| 2-CN | H | H | H | H | 2-NO$_2$ | H | 197–199 |
| 2-F | H | H | H | H | 2-NO$_2$ | H | 177–182 |
| 2-Cl | H | H | H | H | 2-NO$_2$ | H | 173–178 |
| 3-CN | H | H | H | H | 2-NO$_2$ | H | 172–175 |
| 3-CN | H | H | H | H | 4-NO$_2$ | H | 153 d. |
| 2-CN | H | H | H | H | 3-NO$_2$ | H | 132–136 |
| 2-CN | H | H | H | H | 4-NO$_2$ | H | 123 d. |
| 3-Cl | H | H | H | H | 2-NO$_2$ | H | 163 d. |
| 3-Cl | H | H | H | H | 4-NO$_2$ | H | 172 d. |
| 3-CF$_3$ | 5-CF$_3$ | H | 4-Cl | H | H | H | 185–210 |
| 3-CF$_3$ | H | H | 3-CH$_3$ | H | H | H | 180–183 |
| 3-CF$_3$ | H | H | 4-CH$_3$ | H | H | H | 197–200 |
| 3-CF$_3$ | H | H | 2-CH$_3$ | 4-F | H | H | 158–165 |
| 3-CF$_3$ | H | H | 2-CH$_3$ | 5-F | H | H | 135–141 |
| 4-CF$_3$ | H | H | 2-Cl | 3-Cl | 5-Cl | 6-Cl | |
| 4-CF$_3$ | H | H | 2-Cl | 3-Cl | 4-Cl | 5-Cl | |
| 2-Cl | 4-Cl | 6-Cl | 2-Cl | 3-Cl | 4-Cl | 5-Cl | |
| 3-CF$_3$ | 5-CF$_3$ | H | H | H | H | H | |
| 3-CF$_3$ | 5-CF$_3$ | — | 3-Cl | H | H | H | |

EXAMPLE 4

1,5-bis(4-Trifluoromethylphenyl)-3-formazancarbonitrile, Sodium salt

A solution of 3.85 g (0.1 mole) of 1,5-bis-(4-trifluoromethylphenyl)-3-formazancarbonitrile in 150 ml. of methanol at 27° is treated with 0.54 g (0.01 mole) of sodium methoxide dissolved in 15 ml. of methanol. After stirring 15 minutes the solution is evaporated to yield 1,5-bis(4-trifluoromethylphenyl)-3-formazancarbonitrile, sodium salt, m.p. 245° (dec.).

Other agriculturally suitable salts can be prepared by a method similar to Example 4 using either metal alkoxides, metal hydroxides in suitable solvents or ion exchange techniques known in the art. By these methods the following salts can be prepared:

1,5-bis(4-trifluoromethylphenyl)-3-formazancarbonitrile, potassium salt, mp 217° (Dec)
1,5-bis(4-trifluoromethylphenyl)-3-formazancarbonitrile, lithium salt, mp 198°–200°
1,5-bis(3,4-dichlorophenyl)-3-formazancarbonitrile, sodium salt, m.p. 298°–301° (Dec with sintering at 130° )
1,5-bis(3,4-dichlorophenyl)-3-formazancarbonitrile, potassium salt, mp >300°
1,5-bis(3,4-dichlorophenyl)-3-formazancarbonitrile, lithium salt
1-(3-trifluoromethylphenyl)-5-(4-chlorophenyl)-3-formazan carbonitrile, sodium salt, mp 233° (Dec)
1-(4-trifluoromethylphenyl)-5-(4-chlorophenyl)-3-formazancarbonitrile, potassium salt, mp 225° (Dec)
1-(4-trifluoromethylphenyl)-5-(4-chlorophenyl)-3-formazancarbonitrile, lithium salt

Example 5

1,5-bis(3,4-Dichlorophenyl)-3-formazancarbonitrile sodium salt

A solution of 2.0 parts of 1,5-bis(3,4-dichlorophenyl)-3-formazancarbonitrile in 50 parts of acetone plus 5.2 parts of 1.0N sodium hydroxide is stirred at ambient temperature for ½ hour. The solution is evaporated to dryness to give the 1,5-bis(3,4-dichlorophenyl)-3-formazancarbonitrile sodium salt, m.p. 298°–301° (Dec with sintering at 130° C).

EXAMPLE 6

1,5-bis(3,4-dichlorophenyl)-3-formazancarbonitrile potassium salt

A column of 40 parts of Hexyl ® 101 strong acid ion exchange resin (Fisher Scientific Co.) is treated with an excess of 10% potassium hydroxide. Then washed with distilled water until the solvent is neutral.

A solution of 1.5 parts of 1,5-bis(3,4-dichlorophenyl)-3-formazancarbonitrile sodium salt in 100 parts of acetone plus 100 parts of water is passed through the column. The column is washed with an additional 100 parts of acetone plus 100 parts of acetone plus 100 parts water. The combined solvents are evaporated to dryness to give the 1,5-bis(3,4-dichlorophenyl)-3-formazancarbonitrile potassium salt, m.p. >300° C.

Useful formulations of the compounds of this invention can be prepared in conventional ways. They include dusts, granules, solutions, suspensions, emulsions, wettable powders, emulsifiable concentrates, and the like. Many of these may be applied directly. Sprayable formulations can be extended in suitable media and used at spray volumes of from a few liters to several thousand liters per hectare. High strength compositions are primarily used as intermediates for further formulations. The formulations, broadly, contain about 1% to 99% by weight of active ingredient and at least one of a) about 0.1% to 20% surfactant(s) and b) about 5% to 99% solid or liquid diluent(s). More specifically, they will contain these ingredients in the following approximate proportions:

|  | Percent by Weight | | |
| --- | --- | --- | --- |
|  | Active Ingredient | Diluent(s) | Surfactant(s) |
| Wettable Powders | 20–90 | 0–74 | 1–10 |
| Oil Suspensions | 5–50 | 40–95 | 0–15 |
| Emulsions, Solutions (including Emulsifiable Concentrates) |  |  |  |
| Aqueous Suspensions | 10–50 | 40–84 | 1–20 |
| Dusts | 1–25 | 70–99 | 0–5 |
| Granules | 1–95 | 5–99 | 0–15 |
| High Strength Compositions | 90–99 | 0–10 | 0–2 |

The active ingredient(s) can be one compound of the invention or a mixture of two or more of the compounds.

Lower or higher levels of active ingredients can, of course, be present depending on the intended use and the physical properties of the compound. Higher ratios of surfactant to active ingredient are sometimes desirable, and are achieved by incorporation into the formulation or by tank mixing.

Typical solid diluents are described in Watkins, et. al., "Handbook of Insecticide Dust Diluents and Carriers", 2nd. Edn., Dorland Books, Caldwell, N.J. The more absorptive diluents are preferred for wettable powders and the denser ones for dust. Typical liquid diluents and solvents are described in Marsden, "Solvents Guide," 2nd. Ed., *Interscience,* New York, 1950. Solubility under 0.1% is preferred for suspension concentrates; solution concentrates are preferably stable against phase separation at 0° C. "McCutcheon's Detergents and Emulsifiers Annual", Allured Publ. Corp., Ridgewood, New Jersey, as well as Sisely and Wood, "Encyclopedia of Surface Active Agents", Chemical Publ. Co., Inc., New York, 1964, list surfactants and recommended uses. All formulations can contain minor amounts of additives to reduce foam, caking, corrosion, microbiological growth, etc. Preferably, ingredients should be approved by the U.S. Environmental Protection Agency for the use intended.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084). Granules may be made by spraying the active material upon preformed granular carriers or by aglomeration techniques, said techniques exemplified in J. E. Browning, "Agglomeration", *Chemical Engineering,* Dec. 4, 1967, pp. 147ff. and "Perry's Chemical Engineer's Handbook", 4th Edn., McGraw-Hill, N.Y., 1963, pp. 8–59ff.

Further information regarding the art of formulation is found in U.S. Pat. No. 3,576,834, U.S. Pat. No. 3,560,616 and E. Somers, "Formulation", Chapter 6, Torgeson, *Fungicides,* Vol. I, Academic Press, N.Y., 1967.

The following examples illustrate preparation of compositions of this invention. In these examples, parts and percentages are by weight unless otherwise noted.

EXAMPLE 7

| Wettable Powder | |
| --- | --- |
| 1,5-bis(4-trifluoromethylphenyl)-3-formazancarbonitrile | 80% |
| sodium alkylnaphthalenesulfonate | 2% |
| sodium ligninsulfonate | 2% |
| synthetic amorphous silica | 3% |
| kaolinite | 13% |

The ingredients are blended, coarsely hammermilled and then air milled to produce particles of active that are 10 microns in diameter or less. The product is reblended before packaging.

EXAMPLE 8

| Granule | |
| --- | --- |
| wettable powder of Example 7 | 10% |
| attapulgite granules (U.S.S. No. 20–40; 0.84–0.42 mm) | 90% |

A slurry of wettable powder containing 50% solids is sprayed on the surface of attapulgite granules in a double-cone blender. The granules are dried and packaged.

EXAMPLE 9

| Dust | |
| --- | --- |
| 1-(3-trifluoromethylphenyl)-5-(4-chlorophenyl)-3-formazancarbonitrile | 10% |
| attapulgite | 10% |
| talc | 80% |

The active ingredient is blended with attapulgite and passed through a hammer mill to produce particles less than 200 microns in diameter. The ground concentrate is then blended with powdered talc until homogeneous.

EXAMPLE 10

| Solution | |
| --- | --- |
| 1,5-bis(4-trifluoromethoxyphenyl)-3-formazancarbonitrile | 30% |
| dimethylformamide | 70% |

The ingredients are combined and stirred to produce a solution, which can be used for low volume applications.

EXAMPLE 11

| Aqueous Suspension | |
| --- | --- |
| 1-(4-trifluoromethylphenyl)-5-phenyl-3-formazancarbonitrile | 50.0% |
| polyacrylic acid thickener | 0.3% |
| dodecylphenol polyethylene glycol ether | 0.5% |
| disodium phosphate | 1.0% |
| monosodium phosphate | 0.5% |
| polyvinyl alcohol | 1.0% |
| pentachlorophenol | 0.4% |
| water | 46.3% |

The ingredients are ground together in a sand mill to produce particles that are less than five microns in diameter.

EXAMPLE 12

| High Strength Concentrate | |
|---|---|
| formazancarbonitrile | 98.5% |
| silica aerogel | 0.5% |
| synthetic amorphous fine silica | 1.0% |

The ingredients are blended and ground in a hammermill to produce a high strength concentrate with all particles passing a U.S.S. No. 50 sieve (0.3mm openings). This material may then be formulated in a variety of ways.

The compounds of this invention are useful for control of insects which are detrimental to agriculture and public health. They readily control pestiferous belonging to such orders as: Lepidoptera, Coleoptera, Diptera, Hemiptera, and Orthoptera. More specifically, insects controlled by compounds of this invention include but are not limited to: mosquitos (*Aedes aegypti* and *Culex pipiens*), southern armyworm (*Prodenia eridania*), bollworm (*Heliothis zea*), boll weevil (*Anthonomous grandis*), Mexican bean beetle (*Epilachna varivestis*), house flies (*Musca domestica*), tarnished plant bug (*Lygus lineolaria*), crickets (*Gryllus* spp.) potato beetle (*Leptinotarsa decimlineata*), cabbageworm (*Pieris rapae*), flea beetle (*Epitrix cucumeris* and others), eastern tent caterpillar (*Malacasoma americanum*), beet armyworm (*Spodoptera exigua*), spotted cucumber beetle (*Diabrotica undecimpunctate*), Japanese beetle (*Popillia japonica*), dog tick (*Dermacentor variabilis*), army cutworm (*Chorizagrostis auxiliaris*), fall armyworm (*Laphygma frugiperda*), spuce budworm (*Choristmeura fumiferana*), tobacco budworm (*Heliothis virescens*), cabbage looper (*Trichoplusia ni*), velvet bean caterpillar (*Anticarsia gemmatalia*), tobacco hornworm (*Protopara sexta*), forage looper (*Caenurgina erechtea*), and diamond back moth (*Plutella maculipennis*).

The insects are controlled by applying the material in any convenient formulation to the locus of infestation, to the area to be protected, or to the pests themselves. For the control of insects in agricultural crops, one or more of the compounds are generally applied to the foliage or other plant parts which are infested or which are to be protected. Effective amounts to be applied depend upon the species to be controlled, its life stage, its size and location, the amount of rainfall, the time of year, moisture, temperature, type of application, formulation, and many other variables. In general, 0.05 to 25 kg/ha may be required for insect control in agriculture with rates of 0.1 to 5 kg/ha usually being sufficient. Preferred rates of the most highly preferred compounds in large-scale operations are in the range of ¼ to 1½ kg/ha. When used on an area-wide base, as in the control of mosquito larvae, 1/50 to 10 kg/ha are generally sufficient, and 1/25 to ½ kg/ha are preferred. Pests of man and animal such as flies may be controlled by direct application or application to resting areas such as barn walls, to manure, etc. Where penetration of the insect cuticle is needed for activity, addition of an adjuvant which acts as a penetrant may be beneficial.

The compounds of the invention will generally be used in formulation with a carrier that commonly will consist of oil or water. Applications may be made with concentrated or dilute solutions or suspensions of the insecticide in the carrier. Low volume applications utilizing suspensions containing 7.5% of the active ingredient may be preferred by some applicators while others may prefer dilute solutions or suspensions containing only 25 ppm in high volume applications.

Under some circumstances it may be desirable to add adjuvants such as activated charcoal or Panther Creek Clay to the formulations to improve crop safety. Whether such adjuvants are used will depend on the sensitivity of the crop, the quantity of active ingredient used, weather conditions and other factors.

The compounds of this invention can be mixed with fungicides, bactericides, acaricides, nematicides, insecticides, or other biologically active compounds in order to achieve desired results with a minimum expenditure of time, effort, and material. Amounts of these biologically active materials added for each part by weight of the compounds of this invention may vary from 0.025 to 10 parts by weight. Suitable agents of this type are well known to those skilled in the art. Some are listed below:

Fungicides methyl 2-benzimidazole carbamate
tetramethyl thiuram disulfide (thiauram)
n-dodecylguanidine acetate (dodine)
manganese ethylenebisdithiocarbamate (maneb)
1,4-dichloro-2,5-dimethoxybenzene (chloroneb)
methyl 1-(butylcarbamoyl)-2-benzimidazolecarbamate (benomyl)
N-trichloromethylthiotetrahydrophthalimide (captan)
N-trichloromethylthiophthalimide (folpet)

Bactericides tribasic copper sulfate
streptomycin sulfate

Acaricides senecioic acid, ester with 2-sec-butyl-4,6-dinitrophenol ("Morocide")
6-methyl-1,3-dithiolo[2,3-B]quinonolin-2-one ("Morestan")
ethyl 4,4'-dichlorobenzilate (Chlorobenzilate ®)
1,1-bis(p-chlorophenyl)-2,2,2-trichloroethane (Kelthane ®)
bis(pentachloro-2,4-cyclopentadien-lyl) (Pentac ®)
tricyclohexyl trihydroxide (Plictran ®)
4-chlorophenyl 2,4,5-trichlorophenyl sulfone (Tedion ®)

Nematicides

S-methyl 1-(dimethylcarbamoyl)-N-(methylcarbamoyloxy)-thioformimidate
S-methyl 1-carbamoyl-N-(methylcarbamoyloxy) thioformimidate
N-isopropylphosphoramidic acid, 0-ethyl-0'-[4-(methylthio)-m-tolyl]diester ("Nemacur")

Insecticides 3-hydroxy-N-methylcrotonamide (dimethylphosphate)ester (Azodrin ®)
methyl carbamic acid, ester with 2,3-dihydro-2,2-dimethyl-7-benzofuranol (Furadan ®)
0-[2,4,5-trichloro-α-(chloromethyl)benzyl]phosporic acid, 0', 0'-dimethyl ester (Gardona ®)
2-mercaptosuccinic acid, diethyl ester, S-ester with thionophosphoric acid, dimethyl ester (Malathion ®)
phosphorothioic acid, 0,0-dimethyl, 0-p-nitrophenyl ester (methyl parathion)
methyl carbamic acid, ester with α-napthol (Sevin ®)

methyl 0-(methylcarbamoyl)thiolacetohydroxamate (methomyl)
N'-(4-chloro-o-tolyl)-N,N-dimethylformamidine (Galecron ®)
0,0-diethyl-0-(2-isopropyl-4-methyl-6-pyrimidyl)-phosphorothioate (Diazinon ®)
phosphorothionic acid, 0,0-diethyl ester, 0-ester with 1H-1,2,4-triazol-3-ol, 1-phenyl (triazophos)
2-isopropoxyphenyl N-methylcarbamate (Baygon)
0,0-diethyl-0-(3,5,6-trichloro-2-pyridyl)phosphorothiolate (Dursban)
0,0-diethyl-S-[4-oxo-1,2,3-benzotriazin-3-(4H)-ylmethyl]-phosphorodithioate (Guthion ®)
0,S-dimethylphosphoramidothioate (Monitor ®)
0,S-dimethyl N-acetyl phosphoramidothioate (Orthene ®)
ethyl p-nitrophenyl diester with thionobenzene phosphoric acid (EPN)
2-dimethylamino-5,6-dimethyl-4-pyrimidinol, ester with dimethylcarbamic acid (Pirimor ®)
0,0-dimethyl 0-(3-methyl-4-nitrophenyl)phosphorothioate (Sumithion ®)
Carbamic acid, methyl [2-(ethylthiomethyl)-phenyl]-ester (Croneton)
1-(4-chlorophenyl)-3-(2,6-difluorobenzoyl)-urea (TH-6040)
cyano-(3-phenoxyphenyl)methyl 4'-chloro-α-(1-methylethyl)benzeneacetate (SD 43775) chlorinated camphene with 67-69% chlorine (Toxaphene)

Examples 13 to 34 illustrate the insecticidal qualities of the compounds of this invention. All determinations are by observation.

EXAMPLE 13

Groups of 25 newly hatched yellow fever mosquito larvae were placed in 25 ml aliquots of water. Weighed portions of each of the compounds listed below were dissolved in acetone, and predetermined quantities of these solutions were added individually to the jars containing the mosquito larvae. Food for the larvae was added periodically. The jars were examined daily and dead larvae and pupae were noted. Results were recorded when adults had emerged and the remaining larvae or pupae were dead. A dose response curve was prepared for each compound and the $EC_{50}$ (concentration required to kill 50% of the mosquito larvae or pupae) expressed in ppm was estimated. Data are presented below:

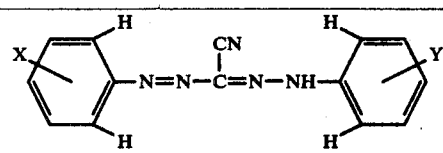

| X | Y | Evaluation $EC_{50}$ ppm |
|---|---|---|
| 4-C$_2$F$_4$HO— | 4-C$_2$F$_4$HO— | 0.45 |
| 4-CF$_3$S— | 4-CF$_3$S— | 0.12 |
| 4-C$_2$F$_5$O— | 4-C$_2$F$_5$O— | 0.14 |
| 3-C$_2$F$_5$O— | 3-C$_2$F$_5$O— | 0.56 |
| 3-F$_5$S— | 3-F$_5$S— | 0.3 |
| 4-F$_5$S— | 4-F$_5$S— | 0.13 |
| 4-CF$_3$— | 4-CF$_3$— | 0.02 |
| 4-OCF$_3$— | 4-OCF$_3$— | 0.09 |
| 4-CF$_3$O— | H | 0.08 |

EXAMPLE 14

Bean plants in the two-leaf stage were sprayed to run-off with formulations of the indicated compounds. These formulations were made by dissolving 50 mg of compound in 10 ml acetone, adding 1 ml of 1% Methocel 15 and diluting to volume with Duponol ®*-water at 1:3000. One hour after spraying, leaves were detached and placed singly in covered Petri dishes with 10 southern armyworm larvae. Evaluations with respect to % kill and % foliage eaten were made one and two days later.

Duponol ®L - E. I. duPont de Nemours & Co., Wilmington, Del.

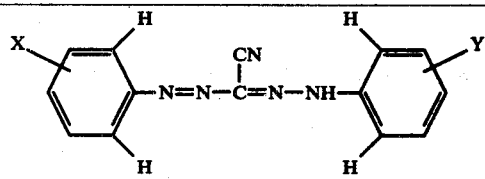

| Compound | | % Spray Conc. | 1 Day | | 2 Days | |
|---|---|---|---|---|---|---|
| X | Y | | % Kill | % Foliage Eaten | % Kill | % Foliage Eaten |
| 4-CF$_3$— | 4-CF$_3$— | .05 | 95 | 2 | 100 | 2 |
| | | .025 | 90 | 2 | 100 | 2 |
| 4-SCF$_3$— | 4-SCF$_3$— | .05 | 90 | 4 | 100 | 4 |
| 4-C$_2$F$_4$HO— | 4-C$_2$F$_4$HO— | .05 | 10 | 40 | 100 | 100 |
| Untreated | | — | 0 | 100 | 0 | 100 |

EXAMPLE 15

Bean plants in the two-leaf stage were sprayed to run-off with the indicated concentrations of 1,5-bis-(4-trifluoromethylphenyl)-3-formazancarbonitrile. Suspensions were made by dissolving 50 mg of compound in 10 ml of acetone, adding 1 ml of 1% Methocel 15* and diluting to volume with Duponol ®-water at 1:3000. Two days later leaves were detached and placed singly into covered Petri dishes along with 10 southern armyworm larvae. Evaluations with respect to % kill and % foliage eaten made one day later are listed below:

| % Spray Concentration | Evaluation | |
|---|---|---|
| | % Kill | % Foliage Eaten |
| .05 | 100 | 3 |
| Untreated Control | 0 | 100 |

*Methanol 15 - Dow Chemical Company, Midland, Michigan.

Methocel 15 - Dow Chemical Company, Midland, Mich.

EXAMPLE 16

Red kidney bean plants in the two-leaf stage were sprayed to run-off with various concentrations of 1,5-bis(4-trifluoromethoxyphenyl)-3-formazancarbonitrile. Suspensions were made by dissolving 50 mg of the compound in 15 ml of acetone, adding 1 ml of a 1% Methocel 15 solution and diluting to volume with a Duponol®-water solution at 1:3000. After plants had dried, leaves were detached and placed singly in covered Petri dishes along with 10 southern armyworm larvae. Evalutations with respect to % kill and % foliage eaten were made each day for three days and and are set forth below:

| % Spray Concentration | Evaluation | | | | | |
|---|---|---|---|---|---|---|
| | 1 Day | | 2 Days | | 3 Days | |
| | % Kill | % Foliage Eaten | % Kill | % Foliage Eaten | % Kill | % Foliage Eaten |
| .05 | 30 | 13 | 100 | 16 | — | — |
| Untreated | 0 | 100 | 0 | 100 | 0 | 100 |

EXAMPLE 17

Cotton leaves, tobacco leaves, and corn ears were dipped in 0.1 and 0.05% acetone solutions of 1,5-bis(4-trifluoromethoxyphenyl)-3-formazancarbonitrile, allowed to dry, and then exposed to larvae of the bollworm. All of the larvae in contact with the treated plant material were killed, protecting the foliage and produce. The leaves and ears in the untreated control were badly eaten.

EXAMPLE 18

Several 200 l capacity plastic pools were placed in a field location and filled with water to a depth of 15–20 cm. A wheat straw infusion was added to provide food for mosquito larvae and egg masses of a native mosquito (Culex pipiens) were added. Naturally occurring mosquitoes also deposited their eggs in the pools. Weighed quantities of 1,5-bis(4-trifluoromethoxyphenyl)-3-formazancarbonitrile were dissolved in minimal quantities of acetone and introduced into the pools to provide concentrations of the active ingredient from 1.0 to 0.01 ppm. Mosquito larvae were completely controlled at the 0.1 ppm level.

EXAMPLE 19

Bean leaf discs 4 cm in diameter cut from the cotyledonary leaves were sprayed with acetone solutions of 1,5-bis(4-trifluoromethylphenyl)-3-formazancarbonitrile. The discs were placed individually in covered Petri dishes on moist filter paper discs along with 2 Mexican bean beetle adults. Evaluations were made 1 day later and are recorded below:

| % Spray Concentration | Evaluation | |
|---|---|---|
| | % Kill | % Foliage Eaten |
| 1 | 100 | 5 |
| .1 | 100 | 30 |
| .05 | 100 | 40 |

EXAMPLE 20

Caged house flies (25 per cage) were sprayed with a 1% acetone solution of 1,5-bis( 4-trifluoromethylphenyl)-3-formazancarbonitrile. After spraying flies were kept in a room at a constant temperature of 26.7° and a constant relative humidity of 55%. Observations made 20 hours later indicated all treated flies were dead while all of those in the untreated control were alive.

EXAMPLE 21

Twenty-five newly hatched mosquito larvae were placed in 25 ml distilled water in 4 oz glass jars, and 10 mg diet, consisting of 2 parts liver powder and 1 part brewer's yeast, were added. The test compound dissolved in 0.2 ml acetone, was added to the jars to give a final concentration of 0.5 ppm. Triplicate runs were made for each compound. The jars were capped and held at 27°–30° under continuous light. Additional diet was added to each jar as follows: day 3, 20 mg diet; each succeeding day, a slight sprinkling of diet to replace that eaten. The number of dead insects were recorded daily. The test was terminated when all insects had died or become pupae. Percent control of the insects was computed without taking into consideration mortality in the control jars (these jars were provided simply to indicate when something was seriously wrong with a particular group of mosquito larvae; mortality in the control jars was usually 7% or less).

The following compounds were tested at a final concentration of 0.5 ppm against yellow fever mosquito larvae (Aedes aegypti) by the described procedure, and were found to kill at least 90% of the larvae.

$$X\text{–}C_6H_3(R_1)(H)\text{–}N=N\text{–}C(CN)=NNH\text{–}C_6H_3(R_3)(H)(Y)(Z)(R_2)$$

| X | $R_1$ | $R_2$ | $R_3$ | Y | Z |
|---|---|---|---|---|---|
| 4-CF$_3$S— | H | H | H | 4-CF$_3$S— | H |
| 4-C$_2$F$_5$O— | H | H | H | 4-C$_2$F$_5$O | H |
| 4-F$_5$S— | H | H | H | 4-F$_5$S— | H |
| 4-CF$_3$— | H | 4-CF$_3$ | H | H | H |
| 4-CF$_3$— | H | 4-CF$_3$ | H | H | H (sodium salt) |
| 4-CF$_3$O— | H | H | H | 4-CF$_3$O— | H |
| 3-CF$_3$— | H | 3-Cl | H | 4-Cl | H |
| 3-CF$_3$— | H | 3-Cl | H | 5-Cl | H |
| 3-CF$_3$— | H | 5-Cl | H | H | H |
| 3-CF$_3$— | H | 3-CF$_3$ | H | 4-Cl | H |
| 4-CN | H | 3-CF$_3$ | H | H | H |
| 3-CF$_3$ | H | 4-CF$_3$— | H | H | H |
| 4-NO$_2$— | H | H | CF$_3$ | H | H |
| 4-CF$_3$— | H | H | H | H | H |
| 4-CF$_3$— | H | 4-Cl— | H | H | H |
| 4-CF$_3$— | H | 3-Cl— | H | 4-Cl | H |
| 4-CF$_3$— | H | 3-CF$_3$ | H | 4-Cl | H |
| 4-CF$_3$— | H | 5-CF$_3$ | 2-Cl | H | H |
| 4-CF$_3$— | H | 4-Cl— | 2-Cl | H | 6-Cl |
| 4-CF$_3$— | H | 4-Br— | H | H | H |
| 4-CF$_3$ | H | H | 2-F | H | H |
| 4-CF$_3$— | H | H | H | 3-F | H |
| 3-CF$_3$— | 4-Cl | 3-CF$_3$ | H | 4-Cl | H |
| 3-Cl | 4-Cl | 3-Cl | H | 4-Cl | H |
| 3-Cl | 5-Cl | 3-Cl | H | 5-Cl | H |
| 3-Cl | H | 3-Cl | H | 4-Cl | H |
| 3-CF$_3$ | H | 3-CF$_3$ | 2-Cl | H | H |
| 4-CF$_3$ | H | H | 2-Br | H | H |
| 4-CF$_3$ | H | 3-Br | H | H | H |
| 3-Cl | H | 3-CF$_3$ | H | 4-Cl | H |
| 4-CN | H | 3-Cl | H | H | H |
| 3-CF$_3$ | H | 3-CF$_3$ | H | 5-CF$_3$ | H |
| 3-CF$_3$ | H | 4-Cl | 2-Cl | H | 6-Cl |
| 4-CF$_3$ | H | H | H | 4-i-C$_3$H$_7$— | H |
| 4-CF$_3$ | H | 3-Cl | H | H | H |
| 4-NO$_2$ | H | H | H | 4-CF$_3$ | H |
| 3-NO$_2$ | H | H | H | 4-CF$_3$ | H |
| 4-CN | H | 3-Cl | H | 5-Cl | H |
| 3-NO$_2$ | H | H | H | 3-Cl | 5-Cl | H |
| 3-Cl | 5-Cl | 4-Cl | H | H | H |
| 4-Cl | H | 4-Cl | H | 5-Cl | H |

-continued $$X\text{–}C_6H_2(R_1)(H)(H)\text{–}N=N\text{–}C(CN)=N\text{–}NH\text{–}C_6H_2(R_3)(Y)(Z)(R_2)$$

| X | $R_1$ | $R_2$ | $R_3$ | Y | Z |
|---|---|---|---|---|---|
| 4-Cl | 5-Cl | H | H | 3-F | H |
| 4-Cl | 5-Cl | 3-Cl | H | 5-Cl | H |
| 3-Cl | 5-Cl | 3-CF$_3$ | H | 4-Cl | H |
| 3-NO$_2$ | H | H | 3-Cl | 4-Cl | H |
| 4-NO$_2$ | H | H | 3-Cl | 4-Cl | H |
| 3-Cl | 4-Cl | H | 2-Cl | H | 6-Cl |
| 4-CN | H | 4-Cl | H | H | H |
| 3-Cl | 4-Cl | 4-Cl | 2-Cl | H | H |
| 3-Cl | 4-Cl | 4-Cl | 2-Cl | H | 6-Cl |
| 3-Cl | 4-Cl | 3-CF$_3$ | H | 4-Cl | H |
| 4-CN | H | H | H | 4-Cl | H |
| 3-Cl | 5-Cl | 3-Cl | H | H | H |
| 3-CF$_3$ | H | H | H | 4-Cl | H |

The following compounds were tested at a final concentration of 0.5 ppm against yellow fever mosquito larvae (*Aedes aegypti*) by the described procedure and were found to kill at least 50% of the larvae.

$$X\text{–}C_6H_2(R_1)(Q)\text{–}N=N\text{–}C(CN)=N\text{–}NH\text{–}C_6H_2(R_3)(Y)(Z)(R_2)$$

| X | $R_1$ | Q | $R_2$ | $R_3$ | Y | Z |
|---|---|---|---|---|---|---|
| 2-Cl | 4-Cl | 6-Cl | 2-Cl | 4-Cl | 6-Cl | H |
| 2-Cl | 4-Cl | 5-Cl | 2-Cl | 4-Cl | 5-Cl | H |
| 2-Cl | 4-Cl | H | 2-Cl | 4-Cl | H | H |
| 2-CF$_3$ | 4-Cl | H | 2-CF$_3$ | 4-Cl | H | H |
| 2-Cl | 5-Cl | H | 2-Cl | 5-Cl | H | H |
| 3-CF$_3$ | 6-F | H | 3-CF$_3$ | 6-F | H | H |
| 2-CF$_3$ | 4-F | H | 2-CF$_3$ | 4-F | H | H |
| 2-Cl | 4-Br | H | 2-Cl | 4-Br | H | H |
| 4-NO$_2$ | H | H | H | 4-NO$_2$ | H | H (sodium salt) |
| 2-NO$_2$ | H | H | 4-Cl | 5-Cl | H | H |
| 3-CF$_3$ | 6-Cl | H | 3-CF$_3$ | 6-Cl | H | H |
| 3-Cl | 4-Cl | H | H | H | 4-NO$_2$ | H |

EXAMPLE 22

Red kidney bean plants in the two-leaf stage were sprayed to run-off with .05% concentrations of the listed 3-formazancarbonitriles. Suspensions were made by dissolving 50 mg quantities of the compounds in 50 ml aliquots of acetone, adding 1 ml of a 1% Methocel 15 solution and diluting to volume with a Duponol®-water solution at 1:3000. After the plants had dried, leaves were detached and placed singly in covered Petri dishes along with 10 southern armyworm larvae. Evaluations were made for each compound 3 days later and are set forth below:

$$X\text{–}C_6H_3(R_1)\text{–}N=N\text{–}C(CN)=N\text{–}NH\text{–}C_6H_2(R_3)(Y)(Z)(R_2)$$

| X | Y | $R_1$ | $R_2$ | $R_3$ | Z | % Kill of Southern Armyworm (3 days) (.05% Spray) |
|---|---|---|---|---|---|---|
| 4-OCF$_2$CF$_2$H | 4-OCF$_2$CF$_2$H | H | H | H | H | 100 |
| 4-SCF$_3$ | 4-SCF$_3$ | H | H | H | H | 100 |
| 4-OC$_2$F$_5$ | 4-OC$_2$F$_5$ | H | H | H | H | 100 |
| 4-SF$_5$ | 4-SF$_5$ | H | H | H | H | 100 |
| 4-CF$_3$ | 4-CF$_3$ | H | H | H | H | 100 |
| 4-CF$_3$ (Na Salt) | 4-CF$_3$ (Na Salt) | H | H | H | H | 100 |
| 4-OCF$_3$ | 4-OCF$_3$ | H | H | H | H | 100 |
| 3-SCF$_3$ | 3-SCF$_3$ | H | H | H | H | 100 |
| 3-OC$_2$F$_5$ | 3-OC$_2$F$_5$ | H | H | H | H | 100 |
| 3-SCF$_2$CF$_2$H | 3-SCF$_2$CF$_2$H | H | H | H | H | 100 |
| 3-OCF$_2$CF$_2$H | 3-OCF$_2$CF$_2$H | H | H | H | H | 100 |
| 3-SF$_5$ | 3-SF$_5$ | H | H | H | H | 100 |
| 3-CF$_3$ | 3-CF$_3$ | H | H | H | H | 100 |
| 3-CF$_3$ | 3-CF$_3$ | 4-Cl | 4-Cl | H | H | 95 |
| 3-Cl | 3-Cl | 4-Cl | 4-Cl | H | H | 100 |
| 3-Cl | 3-Cl | 5-Cl | 5-Cl | H | H | 100 |
| 4-CF$_3$ | H | H | H | H | H | 100 |
| 4-CF$_3$ | 4-Cl | H | H | H | H | 100 |
| 4-CF$_3$ | 3-Cl | H | 5-Cl | H | H | 100 |
| 4-CF$_3$ | 3-CF$_3$ | H | 4-Cl | H | H | 100 |
| 4-CF$_3$ | 3-CF$_3$ | H | H | 2-Cl | H | 100 |
| 4-CF$_3$ | 3-CF$_3$ | H | H | H | H | 100 |
| 4-CF$_3$ | H | H | H | 2-NO$_2$ | H | 95 |
| 3-NO$_2$ | H | H | H | 4-CF$_3$ | H | 100 |
| 4-NO$_2$ | H | H | H | 4-CF$_3$ | H | 100 |
| 4-CF$_3$ | H | H | H | 2-Br | H | 100 |
| 4-CF$_3$ | 3-Br | H | H | H | H | 100 |
| 4-CF$_3$ | 4-Br | H | H | H | H | 100 |
| 4-CF$_3$ | H | H | H | 2-F | H | 100 |
| 4-CF$_3$ | 3-F | H | H | H | H | 100 |
| 4-CF$_3$ | 3-Cl | H | H | H | H | 100 |
| 4-CF$_3$ | 4-isoC$_3$H$_7$ | H | H | H | H | 100 |
| 4-CF$_3$ | H | H | H | 2-CF$_3$ | H | 100 |

-continued $$\underset{R_1}{\overset{X}{\bigcirc}}-N=N-\underset{\underset{CN}{|}}{C}=N-NH-\underset{\underset{Z}{\overset{R_3}{\bigcirc}}}{\overset{}{\bigcirc}}-Y$$

| X | Y | $R_1$ | $R_2$ | $R_3$ | Z | % Kill of Southern Armyworm (3 days) (.05% Spray) |
|---|---|---|---|---|---|---|
| 3-$CF_3$ | 4-Cl | H | H | H | H | 100 |
| 3-$CF_3$ | 3-Cl | H | 5-Cl | H | H | 100 |
| 3-$CF_3$ | 4-Cl | H | 3-Cl | H | H | 100 |
| 3-$CF_3$ | 3-Cl | H | H | H | H | 100 |
| 3-$CF_3$ | 3-$CF_3$ | H | H | 2-Cl | H | 100 |
| 3-$CF_3$ | 3-$CF_3$ | H | 4-Cl | H | H | 100 |
| 3-CN | 3-$CF_3$ | H | H | H | H | 80 |
| 3-$CF_3$ | 4-Br | H | H | H | H | 100 |
| 4-$NO_2$ | H | H | H | 3-$CF_3$ | H | 100 |
| 3-$CF_3$ | H | H | H | 2-F | 6-F | 100 |
| 4-CN | 3-$CF_3$ | H | H | H— | H | 100 |
| 3-$CF_3$ | H | H | H | 2-F | H | 100 |
| 3-$CF_3$ | H | H | H | 2-Cl | H | 100 |
| 3-Cl | H | H | H | 2-$CF_3$ | H | 95 |
| 4-Cl | H | H | H | 2-$CF_3$ | H | 75 |
| 3-Cl | H | 5-Cl | H | 2-$CF_3$ | H | 95 |
| 4-$CF_3$ | H | H | H | 2-$CF_3$ | H | 100 |
| 3-F | 3-F | H | H | H | H | 90 |
| 4-$OCF_2CF_2H$ | H | H | H | H | H | 85 |
| 4-$CF_3$ | 4-Cl | H | 2-Cl | 6-Cl | H | 100 |
| 3-$CF_3$ | 3-Cl | H | 5-Cl | H | H | 100 |
| 2-Cl | 2-Cl | 5-Cl | 5-Cl | H | H | 80 |
| 5-$CF_3$ | 5-$CF_3$ | 2-Cl | 2-Cl | H | H | 100 |
| 2-$CF_3$ | 2-$CF_3$ | 4-F | 4-F | H | H | 85 |
| 3-Cl | 3-Cl | H | H | H | H | 100 |
| 4-$CF_3$ | 4-Cl | H | 3-Cl | H | H | 100 |
| 3-$CF_3$ | 3-$CF_3$ | 5-$CF_3$ | 5-$CF_3$ | H | H | 100 |
| 3-CN | 3-$CF_3$ | H | H | H | H | 80 |
| 2-$CF_3$ | 4-F | H | H | H | H | 100 |
| 3-$CF_3$ | 3-F | H | H | H | H | 100 |
| 3-$CF_3$ | 4-Cl | H | 2-Cl | 6-Cl | H | 100 |
| 3-$CF_3$ | 3-$CF_3$ | H | 5-$CF_3$ | H | H | 100 |
| 3-$CF_3$ | H | H | H | H | H | 95 |
| 4-Cl | 2-Cl | 3-Cl | H | H | H | 80 |
| 4-Cl | 4-Cl | 3-Cl | 3-Cl | H | H (sodium salt) | 100 |
| 3-$CF_3$ | 4-Cl | H | H | H | H (sodium salt) | 100 |
| 3-Cl | 4-Cl | H | H | H | H | 100 |
| 3-$NO_2$ | H | H | H | 3-Cl | H | 95 |
| 3-$CF_3$ | 3-Cl | 4-Cl | 5-Cl | H | H | 100 |
| 4-CN | 3-Cl | H | 5-Cl | H | H | 100 |
| 3-$NO_2$ | 3-Cl | H | H | 5-Cl | H | 100 |
| 4-Cl | 3-Cl | H | 5-Cl | H | H | 100 |
| 4-Cl | 4-Cl | H | 3-Cl | H | H | 100 |
| 4-Cl | 3-F | 3-Cl | H | H | H | 100 |
| 2-$NO_2$ | 4-Cl | H | H | 3-Cl | H | 100 |
| 3-$NO_2$ | 4-Cl | H | H | 3-Cl | H | 100 |
| 4-$NO_2$ | 4-Cl | H | H | 3-Cl | H | 100 |
| 4-Cl | 2-Cl | 3-Cl | 6-Cl | H | H | 90 |
| 4-Cl | 3-Cl | 3-Cl | 5-Cl | H | H | 100 |
| 4-Cl | 4-Cl | 3-Cl | 2-Cl | H | H | 100 |
| 4-Cl | 4-Cl | 3-Cl | 2-Cl | 6-Cl | H | 95 |
| 3-$CF_3$ | 4-Cl | 4-Cl | 3-Cl | H | H | 100 |
| 2-$CF_3$ | 4-Cl | H | 3-Cl | H | H | 100 |
| 4-CN | 4-Cl | 3-Cl | H | H | H | 100 |
| 3-Cl | H | 5-Cl | H | H | H | 100 |
| 4-$NO_2$ | H | H | H | 4-Cl | H | 100 |
| 3-$NO_2$ | H | H | H | 4-Cl | H | 100 |
| 4-Cl | 4-Cl | 2-Cl | H | H | H | 85 |
| 3-$CF_3$ | 4-Cl | 4-Cl | H | H | H | 100 |
| 4-Cl | 4-Cl | 3-Cl | 3-Cl | H | H (potassium salt) | 100 |
| 3-$CF_3$ | 4-Cl | H | H | H | H (potassium salt) | 100 |
| 4-$CF_3$ | 4-$CF_3$ | H | H | H | H (potassium salt) | 100 |
| 4-$CF_3$ | 4-$CF_3$ | H | H | H | H (potassium salt) | 100 |
| 2-$NO_2$ | H | H | H | 3-Cl | H | 100 |
| 4-$NO_2$ | H | H | H | 3-Cl | H | 100 |
| 3-$CF_3$ | H | H | H | 2-$NO_2$ | H | 100 |
| 3-$CF_3$ | 3-$CH_3$ | H | H | H | H | 75 |
| 3-$CF_3$ | 2-$CF_3$ | H | H | H | H | 95 |
| 3-$CF_3$ | 2-$CF_3$ | H | 4-F | H | H | 95 |
| 3-$CF_3$ | 3-$CF_3$ | H | 4-F | H | H | 100 |
| 3-$CF_3$ | 5-$CF_3$ | H | 2-F | H | H | 100 |
| 3-$CF_3$ | 3-$CF_3$ | 4-Br | H | H | H | 100 |
| 3-$CF_3$ | 3-$CF_3$ | 4-F | H | H | H | 90 |
| 3-$CF_3$ | 2-$CF_3$ | H | 4-Br | H | H | 100 |
| 3-$CF_3$ | 3-$CF_3$ | H | 6-Br | H | H | 100 |
| 2-$NO_2$ | H | 4-$CF_3$ | H | 3-$CF_3$ | H | 100 |

-continued

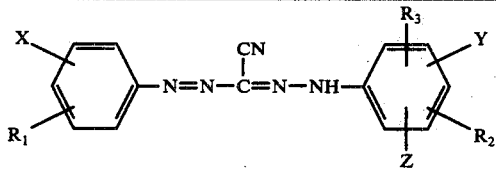

| X | Y | $R_1$ | $R_2$ | $R_3$ | Z | % Kill of Southern Armyworm (3 days) (.05% Spray) |
|---|---|---|---|---|---|---|
| 4-NO$_2$ | H | 2-CF$_3$ | H | 3-CF$_3$ | H | 100 |
| 3-CF$_3$ | 2-CH$_3$ | H | 4-F | H | H | 80 |
| 3-CF$_3$ | 2-CH$_3$ | H | 3-F | H | H | 100 |
| 3-CF$_3$ | 3-CF$_3$ | H | 4-Cl | H | H | 100 |
| 3-CF$_3$ | 4-Cl | 5-CF$_3$ | H | H | H | 100 |
| 4-CF$_3$ | 3-CF$_3$ | H | 5-CF$_3$ | H | H | 100 |
| 4-CN | 3-Cl | H | H | H | H | 100 |
| 3-Cl | 3-CF$_3$ | H | 4-CL | H | H | 100 |
| 3-Cl | 3-Cl | H | 5-Cl | H | H | 100 |
| 3-Cl | 4-Cl | H | 3-Cl | H | H | 100 |
| Untreated Control | | | | | | 0 |

EXAMPLE 23

Soybean plants in the two-true-leaf stage were sprayed to run-off with an aqueous suspension of 1,5-bis(4-trifluoromethyl)-3-formazancarbonitrile at a concentration of 0.05%. The formulation used contained 44% activated carbon in addition to the other normal formulating agents. Plants were allowed to grow for 8 days under lights in the laboratory and were in excellent condition having thrifty dark green foliage. Leaves were then detached and placed in Petri dishes (3/dish) along with 10 southern armyworm larvae approximately 1.2 cm in length. One day later the larvae in the untreated control were all found to be alive while those exposed to the treated foliage were all dead.

EXAMPLE 24

Test units each containing 10 lygus bugs were prepared from insects collected at a field site in Delaware. Two replicates were sprayed with acetone solutions containing 1,5-bis(4-trifluoromethylphenyl)-3-formazancarbonitrile at a concentration of 0.01% and two were sprayed with plain acetone (untreated control). The insects were placed in a room held at constant temperature and constant humidity and provided with drinking water. Results of observations made three days later are set forth below:

| % Spray Concentration | Replicate Number | Evaluation % Dead |
|---|---|---|
| 0.01 | 1 | 100 |
|  | 2 | 100 |
| Untreated Control | 1 | 20 |
|  | 2 | 20 |

EXAMPLE 25

Red kidney bean plants approximately two weeks old were sprayed to run-off in duplicate with a 0.05% suspension of 1,5-bis(4-trifluoromethylphenyl)-3-formazancarbonitrile. They were then allowed to dry and were each caged with 10 gray crickets. Two days later much of the foliage of the control plants was eaten and most of the crickets were alive and feeding. All of the crickets caged with the treated plants were dead allowing them to grow unmolested.

EXAMPLE 26

Leaf discs 4.2 cm in diameter were cut from the cotyledonary leaves of bean plants. These leaves were dipped into an acetone solution of 1,5-bis(4-trifluoromethyl-3-formazancarbonitrile at a concentration of 0.1% and then allowed to dry. The treated discs were placed individually in Petri dishes along with 10 spotted cucumber beetles. All beetles in the untreated control were alive at the time of evaluation 1 day later while all beetles exposed to the treated discs were dead.

EXAMPLE 27

Twenty corn earworm larvae reared individually on a standard artificial diet in 30 cc cups were treated topically with an acetone solution of 1,5-bis(4-trifluoromethylphenyl)-3-formazancarbonitrile. Larvae were treated by applying 1 microliter of solution containing 1 microgram of the compound to the dorsal area of each insect. Two days later all 20 of the treated larvae were dead while the 20 untreated larvae comprising the check were all alive and growing rapidly.

EXAMPLE 28

Red kidney bean plants in the two-leaf stage were sprayed in triplicate with a 0.01% suspension of 1,5-bis(4-trifluoromethylphenyl)-3-formazancarbonitrile in water. Leaves were detached singly from the plants and placed in covered Petri dishes along with 10 beet armyworm larvae eight days old weighing approximately 13 mg each. The insect culture was a standard laboratory strain obtained from Tucson, Ariz. Two days later all insects feeding on the treated leaves were dead. Ninety-five percent of those feeding on the untreated foliage were alive and growing rapidly.

EXAMPLE 29

A flowering crabapple tree growing in Mendenhall, Pennsylvania, infested with eastern tent caterpillar was sprayed with an aqueous suspension of a wettable powder formulation of 1,5-bis(4-trifluoromethylphenyl)-3-formazancarbonitrile at a concentration of 320 ppm active ingredient. Larvae were approximately 1.5 cm in length at time of spraying. An observation made 5 days later showed many caterpillars dead in the nest and no live caterpillars present on the leaves or branches. Caterpillars on a similar but untreated tree located close by were large and vigorous and had destroyed much of the foliage.

EXAMPLE 30

Discs 4 cm in diameter were cut from leaves of a Linden tree and were lightly sprayed with acetone solutions of 1,5-bis(4-trifluoromethylphenyl)-3-formazancarbonitrile (A), 1-(3,5-dichlorophenyl)-5-(3-trifluoromethylphenyl)-3-formazancarbonitrile (B), and 1,5-bis(3,4-dichlorophenyl)-3-formazancarbonitrile (C). The discs were placed individually on moistened filter paper in Petri dishes and two Jananese beetles were added to each dish. Evaluations made 48 hours later are recorded below and show the excellent control of beetles that is obtained with the compounds of this invention.

| Compound | Concentration of Active Ingredient (%) | % Kill (48 hrs.) |
| --- | --- | --- |
| A | .01 | 100 |
| B | .01 | 100 |
| C | .01 | 100 |
| Untreated Control | — | 0 |

EXAMPLE 31

Cotton plants approximately 25 cm in height were sprayed to run-off with an aqueous suspension of 1,5-bis(4-trifluoromethylphenyl)-3-formazancarbonitrile at a concentration of 50 ppm. Two days later each test plant was caged with ten boll weevils. Three days after caging, 100% of the weevils on the treated plants were found to be dead compared with only 8% on the untreated plants. The treated plants sustained very little feeding while the untreated plants were moderately damaged.

EXAMPLE 32

Acetone solutions of 1,5-bis(4-trifluoromethylphenyl)- 3-formazancarbonitrile (A) and 1,5-bis(3,4-dichlorophenyl)-3-formazancarbonitrile (B) both at concentrations of 100 ppm were sprayed into jars (6.5 cm × 6.5 cm) and caps in order to deposit a light film of solution. After drying five dog ticks were placed in each of the jars which were then capped. Evaluation of results was made two days later. Data are recorded below:

| Compound | Concentration of Active Ingredient (ppm) | % Kill |
| --- | --- | --- |
| A | 100 | 100 |
| B | 100 | 100 |
| Untreated Control | — | 0 |

EXAMPLE 33

Tests with 1,5-bis(4-trifluoromethylphenyl)-3-formazancarbonitrile (A) and 1-(4-chlorophenyl)-5-(3-trifluoromethylphenyl)-3-formazancarbonitrile (B) were conducted in a field of cabbage plants in Newark, Del. Test plots were 7 meters in length and were replicated four times. Plants were set out in late spring and spraying on a weekly schedule was started after insects had become established. Large populations of imported cabbage worms and flea beetles rapidly developed in the untreated plots. Data gathered on the two compounds on Aug. 15, 1974 are set forth below and indicate excellent control of both insects.

| Compound | Concentration (active) ppm | % Control Imported Cabbage Worm | Flea Beetle |
| --- | --- | --- | --- |
| A | 320 | 99 | 92 |
| B | 320 | 99 | 90 |
| Untreated Check | — | 0 (93% chewed foliage) | 0 (30% of outer leaves and 50% of head leaves damaged) |

EXAMPLE 34

Potato leaves approximately 4 cm × 3 cm were detached from a plant and lightly sprayed with an acetone solution of 1,5-bis(4-trifluoromethylphenyl)-3-formazancarbonitrile at a concentration of 0.01% (active ingredient). The sprayed leaves were allowed to dry momentarily, then placed individually on moist filter paper discs in Petri dishes along with two Colorado potato beetles per dish. Observations made 48 hours after treatment showed that all beetles on the treated foliage were dead while those on the untreated foliage were healthy and continuing to feed.

We claim:

1. A compound of the formula

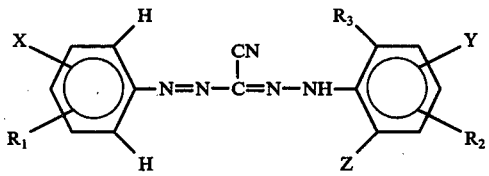

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine or nitro;

Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;

$R_1$ is hydrogen, chlorine, bromine, fluorine or trifluoromethyl;

$R_2$ is hydrogen, chlorine, bromine, fluorine or trifluoromethyl;

$R_3$ is hydrogen, chlorine, bromine, fluorine, trifluoromethyl, or nitro;

Z is hydrogen, chlorine, bromine, or fluorine, provided
  1. when X is nitro at least one of Y or $R_3$ must be trifluoromethyl;
  2. when Y is alkyl of 1–4 carbon atoms, X is trifluoromethyl;
  3. when $R_3$ is nitro, X is trifluoromethyl; and
  4. when X is halogen, no more than three of $R_1$, $R_2$, $R_3$, Z and Y can be hydrogen, or an agriculturally suitable salt thereof.

2. A compound of claim 1 wherein the salt is the lithium, potassium, or sodium salt.

3. A compound of claim 1 wherein
X is trifluoromethyl, chlorine, bromine, 4-pentafluoroethoxy, or nitro;

Y is hydrogen, trifluoromethyl, chlorine, bromine, fluorine, 4-pentafluoroethoxy, or branched alkyl of 3 or 4 carbon atoms;

$R_1$ is hydrogen, chlorine or bromine;

$R_2$ is hydrogen, chlorine or bromine; and $R_3$ and Z are both hydrogen, provided 1. when X is halogen, no more than one of $R_1$, $R_2$ and Y can be hydrogen;
2. when Y is branched alkyl of 3 or 4 carbon atoms, X is trifluoromethyl; and
3. when X is nitro, Y is trifluoromethyl, or an agriculturally suitable salt thereof.

4. A compound of claim 3 wherein the salt is the lithium, potassium or sodium salt.

5. A compound of claim 3 wherein
X is trifluoromethyl, chlorine, bromine, or 4-pentafluoroethoxy; and
Y is hydrogen, chlorine, bromine, fluorine, 4-pentafluoroethoxy or branched alkyl of 3 or 4 carbon atoms; or an agriculturally suitable salt thereof.

6. A compound of claim 5 wherein the salt is the lithium, potassium or sodium salt.

7. A compound of claim 5 wherein
X is chlorine, bromine or 4-pentafluoroethoxy; and
Y is hydrogen, chlorine, bromine, fluorine or 4-pentafluoroethoxy; or an agriculturally suitable salt thereof.

8. A compound of claim 7 wherein the salt is the lithium, potassium, and sodium salt thereof.

9. A compound of claim 3 wherein
X is trifluoromethyl; and
Y is trifluoromethyl, hydrogen, chlorine or bromine; and the salt is the lithium, potassium, or sodium salt.

10. A compound free formazancarbonitrile of claim 3 wherein X is trifluoromethyl; and Y is trifluoromethyl, hydrogen, chlorine or bromine.

11. A compound of claim 5 wherein
X is chlorine or bromine;
Y is chlorine or bromine; and
$R_2$ is chlorine or bromine;
and the salt is the lithium, potassium or sodium salt.

12. A compound free formazancarbonitrile of claim 5 wherein X is chlorine or bromine; Y is chlorine or bromine and $R_2$ is chlorine or bromine.

13. The compound of claim 1, 1,5-bis(4-trifluoromethylphenyl)-3-formazancarbonitrile.

14. The compound of claim 1, 1,5-bis(3,4-dichlorophenyl)-3-formazancarbonitrile.

15. The compound of claim 1, 1-(4-trifluoromethylphenyl)-5-phenyl-3-formazancarbonitrile.

16. The compound of claim 1, 1-(4-trifluoromethylphenyl)-5-(4-chlorophenyl)-3-formazancarbonitrile.

17. The compound of claim 1, 1-(3-trifluoromethylphenyl)-5-(4-chlorophenyl)-3-formazancarbonitrile.

18. The compound of claim 1, 1-(3-trifluoromethylphenyl)-5-(3,5-dichlorophenyl)-3-formazancarbonitrile.

19. The compound of claim 1, 1-(4-trifluoromethylphenyl)-5-(3,4-dichlorophenyl)-3-formazancarbonitrile.

20. The compound of claim 1, 1,5-bis(3,5-dichlorophenyl)-3-formazancarbonitrile.

21. The compound of claim 1, 1-(4-trifluoromethylphenyl)-5-(4-chloro-3-trifluoromethylphenyl)-3-formazancarbonitrile.

22. The compound of claim 1, 1-(4-trifluoromethylphenyl)-5-(2-chloro-5-trifluoromethylphenyl)-3-formazancarbonitrile.

23. The compound of claim 1, 1-(4-trifluoromethylphenyl)-5-(2,6-difluorophenyl)-3-formazancarbonitrile.

24. The compound of claim 1, 1-(4-trifluoromethylphenyl)-5-(3-nitrophenyl)-3-formazancarbonitrile.

25. The compound of claim 1, 1-(4-trifluoromethylphenyl)-5-(4-nitrophenyl)-3-formazancarbonitrile.

26. The compound of claim 1, 1-(4-trifluoromethylphenyl)-5-(3-fluorophenyl)-3-formazancarbonitrile.

27. The compound of claim 1, 1-(4-trifluoromethylphenyl)-5-(3-chlorophenyl)-3-formazancarbonitrile.

28. The compound of claim 1, 1-(4-trifluoromethylphenyl)-5-(4-isopropylphenyl)-3-formazancarbonitrile.

29. The compound of claim 1, 1-(4-trifluoromethylphenyl)-5-(2,4,6-trichlorophenyl)-3-formazancarbonitrile.

30. The compound of claim 1, 1-(4-trifluoromethylphenyl)-5-(3-trifluoromethylphenyl)-3-formazancarbonitrile.

31. The compound of claim 1, 1-(4-trifluoromethylphenyl)-5-(3-bromophenyl)-3-formazancarbonitrile.

32. The compound of claim 1, 1-(4-trifluoromethylphenyl)-5-(4-bromophenyl)-3-formazancarbonitrile.

33. The compound of claim 1, the potassium salt of 1,5-bis(3,4-dichlorophenyl)-3-formazancarbonitrile.

34. A free formazancarbonitrile of claim 1.

35. A free formazancarbonitrile of claim 3.

36. A free formazancarbonitrile of claim 5.

37. A free formazancarbonitrile of claim 7.

38. A method of controlling insects which consists essentially of applying to the locus of infestation, to the area to be protected, or to the insects themselves, an insecticidally effective amount of a compound of the formula:

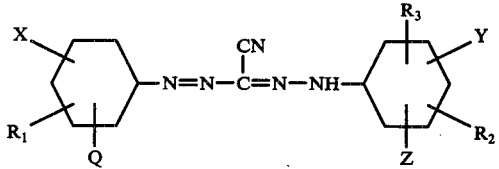

wherein:

X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine or nitro;

Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;

$R_1$ is hydrogen, chlorine, bromine, fluorine, or trifluoromethyl;

$R_2$ is hydrogen, chlorine, bromine, fluorine, or trifluoromethyl;

$R_3$ is hydrogen, chlorine, bromine, fluorine, trifluoromethyl or nitro;

Z is hydrogen, chlorine, bromine, or fluorine, and

Q is hydrogen, chlorine, bromine, or fluorine, provided 1. when Y is alkyl of 1–4 carbon atoms, X is trifluoromethyl;
2. when X is 4-chloro, 4-bromo or 4-fluoro and $R_1$, Q, and three of $R_2$, Z, Y and $R_3$ are hydrogen, then the remainder of $R_2$, Z, Y and $R_3$ must be other then 4-chloro, 4-bromo or 4-fluoro;
3. when X is nitro, $R_3$ is other than hydrogen; and 4. when X is halogen, at least one of $R_1$, $R_2$, $R_3$, Q, Y and Z must be other than hydrogen;
or an agriculturally suitable salt thereof.

39. The method of claim 38 wherein said compound is a free formazancarbonitrile.

40. The method of claim 39 wherein:
X is trifluoromethyl, chlorine, bromine, pentafluoroethoxy, or nitro;
Y is hydrogen, trifluoromethyl, chlorine, bromine, fluorine, or pentafluoroethoxy or branched alkyl of 3-4 carbon atoms;
$R_1$ is hydrogen, chlorine, bromine, or trifluoromethyl;
$R_2$ is hydrogen, chlorine, bromine, or trifluoromethyl;
$R_3$ is hydrogen;
Z is hydrogen or chlorine; and
Q is hydrogen or chlorine; provided that
 1. when Y is branched alkyl of 3 or 4 carbon atoms, X is trifluoromethyl;
 2. when X is halogen, no more than one of $R_1$, $R_2$ and Y can be hydrogen; and
 3. when X is nitro, Y is other than hydrogen.

41. The method of claim 38 wherein the salt is the lithium, potassium or sodium salt.

42. The method of claim 38 wherein:
X is trifluormethyl, chlorine, bromine, pentafluoroethoxy, or nitro;
Y is hydrogen, trifluoromethyl, chlorine, bromine, fluorine or pentafluoroethoxy or branched alkyl of 3 or 4 carbon atoms;
$R_1$ is hydrogen, chlorine, bromine, or trifluoromethyl;
$R_2$ is hydrogen, chlorine, bromine, or trifluoromethyl;
$R_3$ is hydrogen;
Z is hydrogen or chlorine; and
Q is hydrogen or chlorine, provided
 1. when Y is branched alkyl of 3 or 4 carbon atoms, X is trifluoromethyl;
 2. when X is halogen, no more than one of $R_1$, $R_2$ and Y can be hydrogen; and
 3. when X in nitro, Y is other than hydrogen; or an agriculturally suitable salt thereof.

43. The method of claim 42 wherein the salt is the lithium, potassium or sodium salt.

44. The method of claim 38, wherein the compound is a free farmazancarbonitrile of the formula

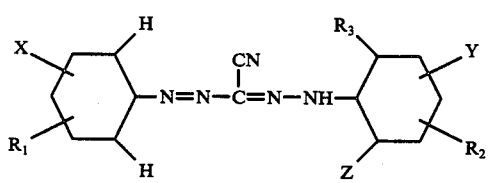

wherein:
X is trifluoromethoxy, trifluoromethylthio, 1,1,2,2-tetrafluoroethoxy, 1,1,2,2-tetrafloroethylthio, pentafluoroethoxy, pentafluoroethylthio, pentafluorothio, cayano, trifluoromethyl, chlorine, bromine, fluorine, or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1-4 carbon atoms;
$R_1$ is hydrogen, chlorine, bromine, fluorine or trifluoromethyl;
$R_2$ is hydrogen, chlorine, bromine, fluorine or trifluoromethyl;
$R_3$ is hydrogen, chlorine, bromine, fluorine, trifluoromethyl, or nitro;
Z is hydrogen, chlorine, bromine or fluorine, provided
 1. when Y is alkyl of 1-4 carbon atoms; X is trifluoromethyl;
 2. when $R_3$ is nitro, X is trifluoromethyl;
 3. when X is nitro at least one of Y or $R_3$ must be trifluoromethyl; and
 4. when x is halogen, no more than three of $R_1$, $R_2$, $R_3$ Z and Y can be hydrogen.

45. The method of claim 38 wherein the compound is of the formula

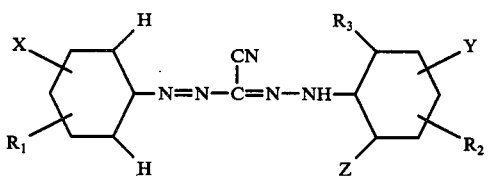

wherein
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine, or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1-4 carbon atoms;
$R_1$ is hydrogen, chlorine, bromine, or trifluoromethyl;
$R_2$ is hydrogen, chlorine, bromine, or trifluoromethyl;
$R_3$ is hydrogen, chlorine, bromine, fluorine, trifluoromethyl, or nitro;
Z is hydrogen, chlorine, bromine, or fluorine; provided
 1. when Y is alkyl of 1-4 carbon atoms, X is trifluoromethyl;
 2. when $R_3$ is nitro, X is trifluoromethyl;
 3. when X is 4-chloro, 4-bromo or 4-fluoro, and $R_1$, $R_3$, Z and one of $R_2$ and Y are hydrogen, then the remainder of $R_2$ and Y must be other than 4-chloro, 4-bromo or 4-fluoro; and
 4. when X is nitro, Y is trifluoromethyl; or an agriculturally suitably salt thereof.

46. The method of claim 45 wherein said compound is a free formazancarbonitrile.

47. The method of claim 45 wherein the salt is the lithium, potassium or sodium salt.

48. The method of claim 45 wherein:
X is trifluoromethyl, chlorine, bromine, pentafluoroethoxy or nitro;
Y is hydrogen, trifluoromethyl, chlorine, bromine, fluorine, pentafluoroethoxy or branched alkyl of 3 or 4 carbon atoms;
$R_3$ is hydrogen; and
Z is hydrogen,
provided when X is halogen, no more than one of $R_1$, $R_2$ and Y can be hydrogen; or an agriculturally suitable salt thereof.

49. The method of claim 48 wherein said compound is a free formazancarbonitrile.

50. The method of claim 49 wherein:
X is trifluoromethyl;
Y is trifluoromethyl, hydrogen, chlorine or bromine;
$R_1$ is hydrogen, chlorine or bromine; and R₂ is hydrogen, chlorine or bromine.
51. The method of claim 48 wherein
  X is trifluormethyl, chlorine, bromine or pentafluoroethoxy;
  Y is hydrogen, chlorine, bromine, fluorine, pentafluoroethoxy or branched alkyl of 3 or 4 carbon atoms;
  R₁ is hydrogen, chlorine or bromine; and
  R₂ is hydrogen, chlorine or bromine;
or an agriculturally suitable salt thereof.
52. The method of claim 51 wherein said compound is a free formazancarbonitrile.
53. The method of claim 52 wherein:
  X is chlorine, bromine, or pentafluoroethoxy; and
  Y is hydrogen, chlorine, bromine, fluorine or pentafluoroethoxy.
54. The method of claim 53 wherein:
  X is chlorine or bromine;
  Y is chlorine or bromine; and
  R₂ is chlorine or bromine.
55. The method of claim 48 wherein the salt is the lithium, potassium or sodium salt.
56. The method of claim 51 wherein the salt is the lithium, potassium or sodium salt.
57. The method of claim 51 wherein:
  X is chlorine, bromine, or pentafluoroethoxy; and
  Y is hydrogen, chlorine, bromine, fluorine or pentafluoroethoxy;
and the salt is the lithium, potassium or sodium salt.
58. The method of claim 57 wherein:
  X is chlorine or bromine;
  Y is chlorine or bromine; and
  R₂ is chlorine or bromine;
and the salt is the lithium, potassium, or sodium salt.
59. The method of claim 48 wherein:
  X is trifluoromethyl;
  Y is trifluoromethyl, hydrogen, chlorine or bromine;
  R₁ is hydrogen, chlorine, or bromine; and
  R₂ is hydrogen, chlorine or bromine;
and the salt is the lithium, potassium or sodium salt.
60. The method of claim 38 wherein the compound is 1,5-bis(4-trifluoromethylphenyl)-3-formazancarbonitrile.
61. The method of claim 38 wherein the compound is 1,5-bis(3,4-dichlorophenyl)-3-formazancarbonitrile.
62. The method of claim 38 wherein the compound is 1-(4-trifluoromethylphenyl)-5-phenyl-3-formazancarbonitrile.
63. The method of claim 38 wherein the compound is 1-(4-trifluoromethylphenyl)-5-(4-chlorophenyl)-3-formazancarbonitrile.
64. The method of claim 38 wherein the compound is 1-(3-trifluoromethylphenyl)-5-(4-chlorophenyl)-3-formazancarbonitrile.
65. The method of claim 38 wherein the compound is 1-(3-trifluoromethylphenyl)-5-(3,5-dichlorophenyl)-3-formazancarbonitrile.
66. The method of claim 38 wherein the compound is 1-(4-trifluoromethylphenyl)-5-(3,4-dichlorophenyl)-3-formazancarbonitrile.
67. The method of claim 38 wherein the compound is 1,5-bis(3,5-dichlorophenyl)-3-formazancarbonitrile.
68. The method of claim 38 wherein the compound is 1-(4-trifluoromethylphenyl)-5-(4-chloro-3-trifluoromethylphenyl)-3-formazancarbonitrile.
69. The method of claim 38 wherein the compound is 1-(4-trifluoromethylphenyl)-5-(2-chloro-5-trifluoromethylphenyl)-3-formazancarbonitrile.
70. The method of claim 38 wherein the compound is 1-(4-trifluoromethylphenyl)-5-(2,6-difluorophenyl)-3-formazancarbonitrile.
71. The method of claim 38 wherein the compound is 1-(4-trifluoromethylphenyl)-5-(3-nitrophenyl)-3-formazancarbonitrile.
72. The method of claim 38 wherein the compound is 1-(4-trifluoromethylphenyl)-5-(4-nitrophenyl)-3-formazancarbonitrile.
73. The method of claim 38 wherein the compound is 1-(4-trifluoromethylphenyl)-5-(3-fluorophenyl)-3-formazancarbonitrile.
74. The method of claim 38 wherein the compound is 1-(4-trifluoromethylphenyl)-5-(3-chlorophenyl)-3-formazancarbonitrile.
75. The method of claim 38 wherein the compound is 1-(4-trifluoromethylphenyl)-5-(4-isopropylphenyl)-3-formazancarbonitrile.
76. The method of claim 38 wherein the compound is 1-(4-trifluoromethylphenyl-5-(2,4,6-trichlorophenyl)-3-formazancarbonitrile.
77. The method of claim 38 wherein the compound is 1-(4-trifluoromethylphenyl)-5-(3-trifluoromethylphenyl)-3-formazancarbonitrile.
78. The method of claim 38 wherein the compound is 1-(4-trifluoromethylphenyl)-5-(3-bromophenyl)-3-formazancarbonitrile.
79. The method of claim 38 wherein the compound is 1-(4-trifluoromethylphenyl)-5-(4-bromophenyl)-3-formazancarbonitrile.
80. The method of claim 38 wherein the compound is the potassium salt of 1,5-bis(3,4-dichlorophenyl)-3-formazancarbonitrile.
81. A method of controlling insects which consists essentially of applying to the locus of infestation, to the area to be protected, or to the insects themselves, an insecticidally effective amount of 1,5-bis-(4-trifluoromethylphenyl)-3-formazancarbonitrile and an insecticidally effective amount of methyl O-(methylcarbamoyl)-thiolacetohydroxamate.
82. A composition consisting essentially of an insecticidally effective amount of a compound of the formula:

wherein:
  X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine or nitro;
  Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;
  R₁ is hydrogen, chlorine, bromine, fluorine, or trifluoromethyl;
  R₂ is hydrogen, chlorine, bromine, fluorine or trifluoromethyl;

$R_3$ is hydrogen, chlorine, bromine, fluorine, trifluoromethyl or nitro;

Z is hydrogen, chlorine, bromine, or fluorine, and

Q is hydrogen, chlorine, bromine, or fluorine, provided
1. when Y is alkyl of 1-4 carbon atoms, X is trifluoromethyl;
2. when X is 4-chloro, 4-bromo or 4-fluoro and $R_1$, Q, and three of $R_2$, Z, Y, and $R_3$ are hydrogen, then the remainder of $R_2$, Y, $R_3$ and Z must be other than 4-chloro, 4-bromo, or 4-fluoro;
3. when X is nitro, $R_3$ is other than hydrogen; and
4. when X is halogen, at least one of $R_1$, $R_2$, $R_3$, Q, Y, and Z must be other than hydrogen;

or an agriculturally suitable salt thereof, and at least one of the members selected from the group consisting of (a) an inert disluent and (b) a surfactant.

83. The composition of claim 82 wherein said compound is a free formazancarbonitrile.

84. The composition of claim 82 wherein the salt is the lithium, potassium or sodium salt.

85. The composition of claim 82 wherein:
X is trifluoromethyl, chlorine, bromine, pentafluoroethoxy, or nitro;
Y is hydrogen, trifluoromethyl, chlorine, bromine, fluorine, pentafluoroethoxy or branched alkyl or 3 or 4 carbon atoms;
$R_1$ is hydrogen, chlorine, bromine, or trifluoromethyl;
$R_2$ is hydrogen, chlorine, bromine, or trifluoromethyl;
$R_3$ is hydrogen;
Z is hydrogen or chlorine; and
Q is hydrogen or chlorine, provided
1. when Y is branched alkyl of 3 or 4 carbon atoms, X is trifluoromethyl;
2. when X is halogen, no more than one of $R_1$, $R_2$ and Y can be hydrogen; and 3. when X is nitro, $R_3$ is other than hydrogen; or an agriculturally suitable salt thereof.

86. The composition of claim 85 wherein said compound is a free formazancarbonitrile.

87. The composition of claim 85 wherein the salt is the lithium, potassium or sodium salt.

88. A composition consisting essentially of an insecticidally effective amount of a compound of the formula:

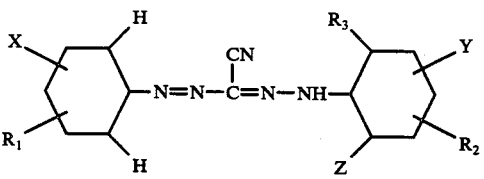

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine, or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1-4 carbon atoms;
$R_1$ is hydrogen, chlorine, bromine, fluorine or trifluoromethyl;
$R_2$ is hydrogen, chlorine, bromine, fluorine or trifluoromethyl;
$R_3$ is hydrogen, chlorine, bromine, fluorine, trifluoromethyl, or nitro;
Z is hydrogen, chlorine, bromine, or fluorine; provided
1. when Y is alkyl of 1-4 carbon atoms; X is trifluoromethyl;
2. when $R_3$ is nitro, X is trifluoromethyl;
3. when X is nitro, at least one of Y or $R_3$ must be trifluoromethyl; and
4. when X is halogen, no more than three of $R_1$, $R_2$, $R_3$ or Z and Y can be hydrogen;

or an agriculturally suitable salt thereof, and at least one of the members selected from the group consisting of (a) an inert diluent and (b) a surfactant.

89. A composition consisting essentially of an insecticidally effective amount of a compound of the formula:

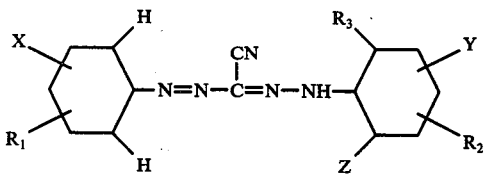

wherein:
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine, or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1-4 carbon atoms;
$R_1$ is hydrogen, chlorine, bromine, or trifluoromethyl;
$R_2$ is hydrogen, chlorine, bromine, or trifluoromethyl;
$R_3$ is hydrogen, chlorine, bromine, or trifluoromethyl;
$R_3$ is hydrogen, chlorine, bromine, fluorine, trifluoromethyl, or nitro;
Z is hydrogen, chlorine, bromine, or fluorine; provided
1. when Y is alkyl of 1-4 carbon atoms, X is trifluoromethyl;
2. when $R_3$ is nitro, X is trifluoromethyl;
3. when X is 4-chloro, 4-bromo or 4-fluoro and $R_1$, $R_3$, Z and one of $R_2$ and Y is hydrogen, then the remainder of $R_2$ and Y must be other than 4-chloro, 4-bromo or 4-fluoro; and
4. when X is nitro, Y is trifluoromethyl;

or an agriculturally suitable salt thereof, and at least one of the members selected from the group consisting of (a) an inert diluent and (b) a surfactant.

90. The composition of claim 89 wherein the salt is the lithium, potassium or sodium salt.

91. The composition of claim 89 wherein
X is trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, cyano, trifluoromethyl, chlorine, bromine, fluorine, or nitro;
Y is hydrogen, trifluoromethoxy, trifluoromethylthio, 1,1,2,2-tetrafluoroethoxy, 1,1,2,2-tetrafluoroethylthio, pentafluoroethoxy, pentafluoroethylthio, pentafluorothio, chlorine, bromine, fluorine, trifluoromethyl, or alkyl of 1–4 carbon atoms;
$R_1$ is hydrogen, chlorine, bromine, or trifluoromethyl;
$R_2$ is hydrogen, chlorine, bromine, or trifluoromethyl;
$R_3$ is hydrogen, chlorine, bromine, fluorine, trifluoromethyl, or nitro;
Z is hydrogen, chlorine, bromine, or fluorine; provided
1. when Y is alkyl of 1–4 carbon atoms, X is trifluoromethyl;
2. when $R_3$ is nitro, X is trifluoromethyl;
3. when X is 4-chloro, 4-bromo or 4-fluoro and $R_1$, Z and two of $R_2$, Y and $R_3$ are hydrogen, then the remainder of $R_2$, Y and $R_3$ must be other than 4-chloro, 4-bromo or 4-fluoro; and
4. when X is nitro, Y is trifluoromethyl.

92. The composition of claim 89 wherein:
X is trifluoromethyl, chlorine, bromine, pentafluoroethoxy or nitro;
Y is hydrogen, trifluoromethyl, chlorine, bromine, fluorine, pentafluoroethoxy or branched alkyl of 3 or 4 carbon atoms;
$R_3$ is hydrogen; and
Z is hydrogen,
provided when X is halogen, no more than one of $R_1$, $R_2$ and Y can be hydrogen; or an agriculturally suitable salt thereof.

93. The composition of claim 92 wherein the salt is the lithium, potassium or sodium salt.

94. The composition of claim 89 wherein:
X is trifluoromethyl, chlorine, bromine, or pentafluoroethoxy; or nitro;
Y is hydrogen, trifluoromethyl, chlorine, bromine, fluorine or pentafluoroethoxy or branched alkyl of 3 or 4 carbon atoms;
$R_3$ is hydrogen; and
Z is hydrogen;
provided when X is halogen, no more than one of $R_1$, $R_2$ an d Y can be hydrogen.

95. The composition of claim 92 wherein
X is trifluoromethyl, chlorine, bromine or pentafluoroethoxy;
Y is hydrogen, chlorine, bromine, fluorine, pentafluoroethoxy or branched alkyl of 3 or 4 carbon atoms;
$R_1$ is hydrogen, chlorine or bromine; and
$R_2$ is hydrogen, chlorine or bromine; or an agriculturally suitable salt thereof.

96. The composition of claim 95 wherein the salt is the lithium, potassium or sodium salt.

97. The composition of claim 92 wherein
X is trifluoromethyl, chlorine, bromine or pentafluoroethoxy;
Y is hydrogen, bromine, fluorine, pentafluoroethoxy or branched alkyl of 3 or 4 carbon atoms;
$R_1$ is hydrogen, chlorine or bromine; and
$R_2$ is hydrogen, chlorine or bromine.

98. The composition of claim 95 wherein:
X is chlorine, bromine, or pentafluoroethoxy; and
Y is hydrogen, chlorine, bromine, fluorine or pentafluoroethoxy;
and the salt is the lithium, potassium or sodium salt.

99. The composition of claim 97 wherein:
X is chlorine, bromine, or pentafluoroethoxy; and
Y is hydrogen, chlorine, bromine, fluorine or pentafluoroethoxy.

100. The composition of claim 92 wherein:
X is trifluoromethyl;
Y is trifluoromethyl, hydrogen, chlorine or bromine;
$R_1$ is hydrogen, chlorine, or bromine; and
$R_2$ is hydrogen, chlorine or bromine;
and the salt is the lithium, potassium or sodium salt.

101. The composition of claim 94 wherein:
X is trifluoromethyl;
Y is trifluoromethyl, hydrogen, chlorine or bromine;
$R_1$ is hydrogen, chlorine or bromine; and
$R_2$ is hydrogen, chlorine or bromine.

102. The composition of claim 98 wherein:
X is chlorine or bromine;
Y is chlorine or bromine; and
$R_2$ is chlorine or bromine;
and the salt is the lithium, potassium or sodium salt.

103. The composition of claim 99 wherein:
X is chlorine or bromine;
Y is chlorine or bromine; and
$R_2$ is chlorine or bromine.

104. The composition of claim 88 wherein the compound is 1,5-bis(4-trifluoromethylphenyl)-3-formazincarbonitrile.

105. The composition of claim 88 wherein the compound is 1,5-bis(3,4-dichlorophenyl)-3-formazancarbonitrile.

106. The composition of claim 88 wherein the compound is 1-(4-trifluoromethylphenyl)-5-phenyl-3-formazancarbonitrile.

107. The composition of claim 88 wherein the compound is 1-(4-trifluoromethylphenyl)-5-(4-chlorophenyl)-3-formazancarbonitrile.

108. The composition of claim 88 wherein the compound is 1-(3-trifluoromethylphenyl)-5-(4-chlorophenyl)-3-formazancarbonitrile.

109. The composition of claim 88 wherein the compound is 1-(3-trifluoromethylphenyl)-5-(3,5-dichlorophenyl)-3-formazancarbonitrile.

110. The composition of claim 88 wherein the compound is 1-(4-trifluoromethylphenyl)-5-(3,4-dichlorophenyl)-3-formazancarbonitrile.

111. The composition of claim 88 wherein the compound is 1,5-bis(3,5-dichlorophenyl)-3-formazancarbonitrile.

112. The composition of claim 88 wherein the compound is 1-(4-trifluoromethylphenyl)-5-(4-chloro-3-trifluoromethylphenyl)-3-formazancarbonitrile.

113. The composition of claim 88 wherein the compound is 1-(4-trifluoromethylphenyl)-5-(2-chloro-5-trifluoromethylphenyl)-3-formazancarbonitrile.

114. The composition of claim 88 wherein the compound is 1-(4-trifluoromethylphenyl)-5-(2,6-difluorophenyl)-3-formazancarbonitrile.

115. The composition of claim 88 wherein the compound is 1-(4-trifluoromethylphenyl)-5-(3-nitrophenyl)-3-formazancarbonitrile.

116. The composition of claim 88 wherein the compound is 1-(4-trifluoromethylphenyl)-5-(4-nitrophenyl)-3-formazancarbonitrile.

117. The composition of claim 88 wherein the compound is 1-(4-trifluoromethylphenyl)-5-(3-fluorophenyl)-3-formazancarbonitrile.

118. The composition of claim 88 wherein the compound is 1-(4-trifluoromethylphenyl)-5-(3-chlorophenyl)-3-formazancarbonitrile.

119. The composition of claim 88 wherein the compound is 1-(4-trifluoromethylphenyl)-5-(4-isopropylphenyl)-3-formazancarbonitrile.

120. The composition of claim 88 wherein the compound is 1-(4-trifluoromethylphenyl-5-(2,4,6-trichlorophenyl)-3-formazancarbonitrile.

121. The composition of claim 88 wherein the compound is 1-(4-trifluoromethylphenyl)-5-(3-trifluoromethylphenyl)-3-formazancarbonitrile.

122. The composition of claim 88 wherein the compound is 1-(4-trifluoromethylphenyl)-5-(3-bromophenyl)-3-formazancarbonitrile.

123. The composition of claim 88 wherein the compound is 1-(4-trifluoromethylphenyl)-5-(4-bromophenyl)-3-formazancarbonitrile.

124. The composition of claim 88 wherein the compound is the potassium salt of 1,5-bis(3,4-dichlorophenyl)-3-formazancarbonitrile.

* * * * *